United States Patent
Harushige et al.

(10) Patent No.: US 10,538,042 B2
(45) Date of Patent: *Jan. 21, 2020

(54) MANUFACTURING METHOD FOR RAW EDGE V-BELT

(71) Applicant: BANDO CHEMICAL INDUSTRIES, LTD., Kobe-shi, Hyogo (JP)

(72) Inventors: Naohisa Harushige, Kobe (JP); Tomoaki Hata, Kobe (JP); Yusaku Taoshita, Kobe (JP); Hideaki Kawahara, Kobe (JP); Masaki Miyanishi, Kobe (JP); Yohei Hattori, Kobe (JP); Hirokazu Sakurai, Kobe (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/138,717

(22) Filed: Sep. 21, 2018

(65) Prior Publication Data
US 2019/0022963 A1   Jan. 24, 2019

Related U.S. Application Data

(63) Continuation of application No. PCT/JP2017/007283, filed on Feb. 27, 2017.

(30) Foreign Application Priority Data

Mar. 23, 2016 (JP) ................................. 2016-059131

(51) Int. Cl.
  B29D 29/10   (2006.01)
  F16G 5/08   (2006.01)

(52) U.S. Cl.
  CPC .......... *B29D 29/103* (2013.01); *B29D 29/10* (2013.01); *F16G 5/08* (2013.01)

(58) Field of Classification Search
  CPC ...... B29D 29/10; B29D 29/103; B29D 29/08; F16G 5/06; F16G 5/08; B29C 47/0042
  (Continued)

(56) References Cited

U.S. PATENT DOCUMENTS 4,359,355 A * 11/1982 Stecklein ............. B29D 29/106
  156/138
7,305,744 B2 * 12/2007 Hara ...................... B29D 29/08
  29/33 S (Continued)

FOREIGN PATENT DOCUMENTS

JP   H4-10145 U    1/1992
JP   2002-340102 A   11/2002
(Continued)

*Primary Examiner* — Matthew J Daniels
*Assistant Examiner* — Yunju Kim
(74) *Attorney, Agent, or Firm* — Maschoff Brennan

(57) ABSTRACT

A production method of a raw edge V-belt uses a belt mold having a plurality of compressed rubber layer-shape grooves arranged adjacent to one another. A shaped structure having a plurality of compressed rubber layer-forming portions on an outer peripheral surface is crosslinked to form a belt slab, while the compressed rubber layer-forming portions fitted in the respective compressed rubber layer-shape grooves of the belt mold. The belt slab is cut into ring-shaped pieces such that one ring-shaped piece corresponds to one compressed rubber layer-forming portion.

18 Claims, 35 Drawing Sheets

(58) Field of Classification Search
USPC .................................... 264/241, 49; 29/33 S
See application file for complete search history.

(56) References Cited

U.S. PATENT DOCUMENTS

| | | | | |
|---|---|---|---|---|
| 2003/0017900 A1* | 1/2003 | Kopang | ................ | B29D 29/00 |
| | | | | 474/260 |
| 2003/0073533 A1* | 4/2003 | Knutson | ................ | B29D 29/08 |
| | | | | 474/263 |
| 2009/0291796 A1* | 11/2009 | Mitsutomi | ........... | B29D 29/103 |
| | | | | 474/252 |
| 2011/0028257 A1* | 2/2011 | Sealey | ..................... | C08K 3/04 |
| | | | | 474/263 |
| 2014/0103562 A1 | 4/2014 | Okubo et al. | | |
| 2019/0084191 A1* | 3/2019 | Scholzen | .............. | B29C 70/541 |

FOREIGN PATENT DOCUMENTS

| | | |
|---|---|---|
| JP | 2004-34352 A | 2/2004 |
| JP | 2004-216857 A | 8/2004 |
| JP | 2004-347108 A | 12/2004 |
| WO | 2012/172717 A1 | 12/2012 |

* cited by examiner

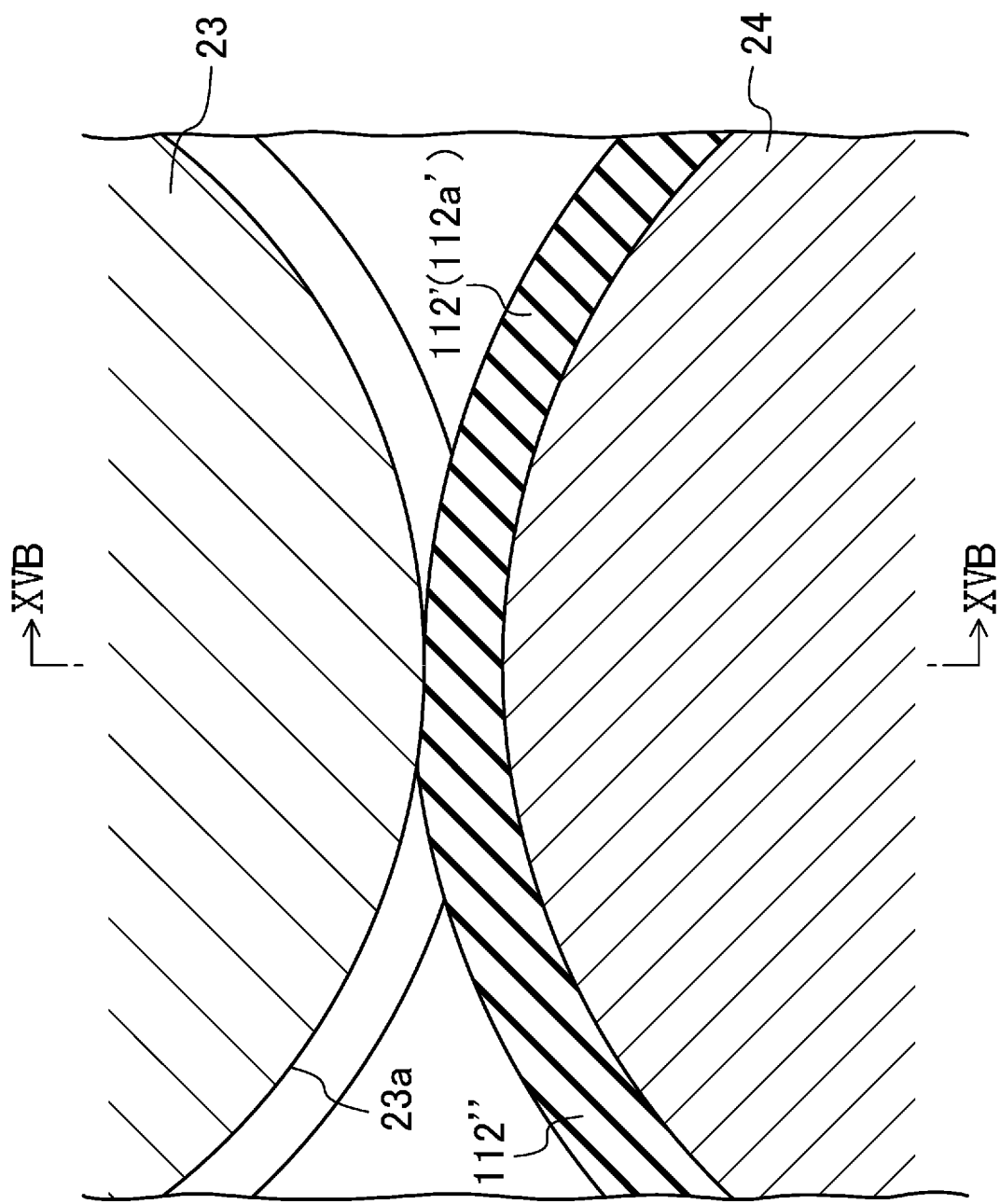

MANUFACTURING METHOD FOR RAW EDGE V-BELT

CROSS-REFERENCE TO RELATED APPLICATIONS

This is a continuation of International Application No. PCT/JP2017/007283 filed on Feb. 27, 2017, which claims priority to Japanese Patent Application No. 2016-059131 filed on Mar. 23, 2016. The entire disclosures of these applications are incorporated by reference herein.

BACKGROUND

The present invention relates to a method for producing a raw edge V-belt.

Raw edge V-belts are produced by cutting a strap body having a trapezoidal cross section from a cylindrical belt slab. In this technique, a large amount of waste rubber is generated from the belt slab because inclined surfaces of the strap body on both sides in the width direction are formed by cutting. In order to reduce such waste rubber, Japanese Unexamined Patent Publication No. 2002-340102 discloses a technique in which, in cutting a raw edge V-belt from a belt slab, both edges of an outer peripheral portion of the belt are maintained at a right angle, and an inner peripheral portion of the belt is ground on both sides in the width direction to form inclined surfaces. Japanese Unexamined Patent Publication No. 2004-347108 discloses that the waste rubber generated at the time of producing the raw edge V-belt is recycled to be used for producing another raw edge V-belt.

SUMMARY

The present invention is directed to a production method of a raw edge V-belt having a compressed rubber layer which forms an inner peripheral side, in a thickness direction, of the raw edge V-belt. The method includes: using a belt mold having a plurality of compressed rubber layer-shape grooves arranged adjacent to one another in a groove width direction; heating and pressing, toward the belt mold, and thereby crosslinking a shaped structure having a cylindrical shape to form a cylindrical belt slab, the shaped structure being made of an uncrosslinked rubber composition and having, on an outer peripheral surface thereof, a plurality of ridges each extending in a circumferential direction and arranged adjacent to one another in an axial direction, while having each of compressed rubber layer-forming portions, which are to be the compressed rubber layer, fitted in an associated one of the compressed rubber layer-shape grooves of the belt mold, each of the compressed rubber layer-forming portions being an associated one of the plurality of ridges of the shaped structure, and cutting the belt slab into ring-shaped pieces such that one ring-shaped piece corresponds to one compressed rubber layer-forming portion.

BRIEF DESCRIPTION OF THE DRAWINGS

FIG. 15A is a diagram for showing how to prepare a core rubber sheet in a component preparation step in a production method 2-1 of the second embodiment.

DETAILED DESCRIPTION

Embodiments will be described in detail below with reference to the drawings.

First Embodiment

Figure 1:
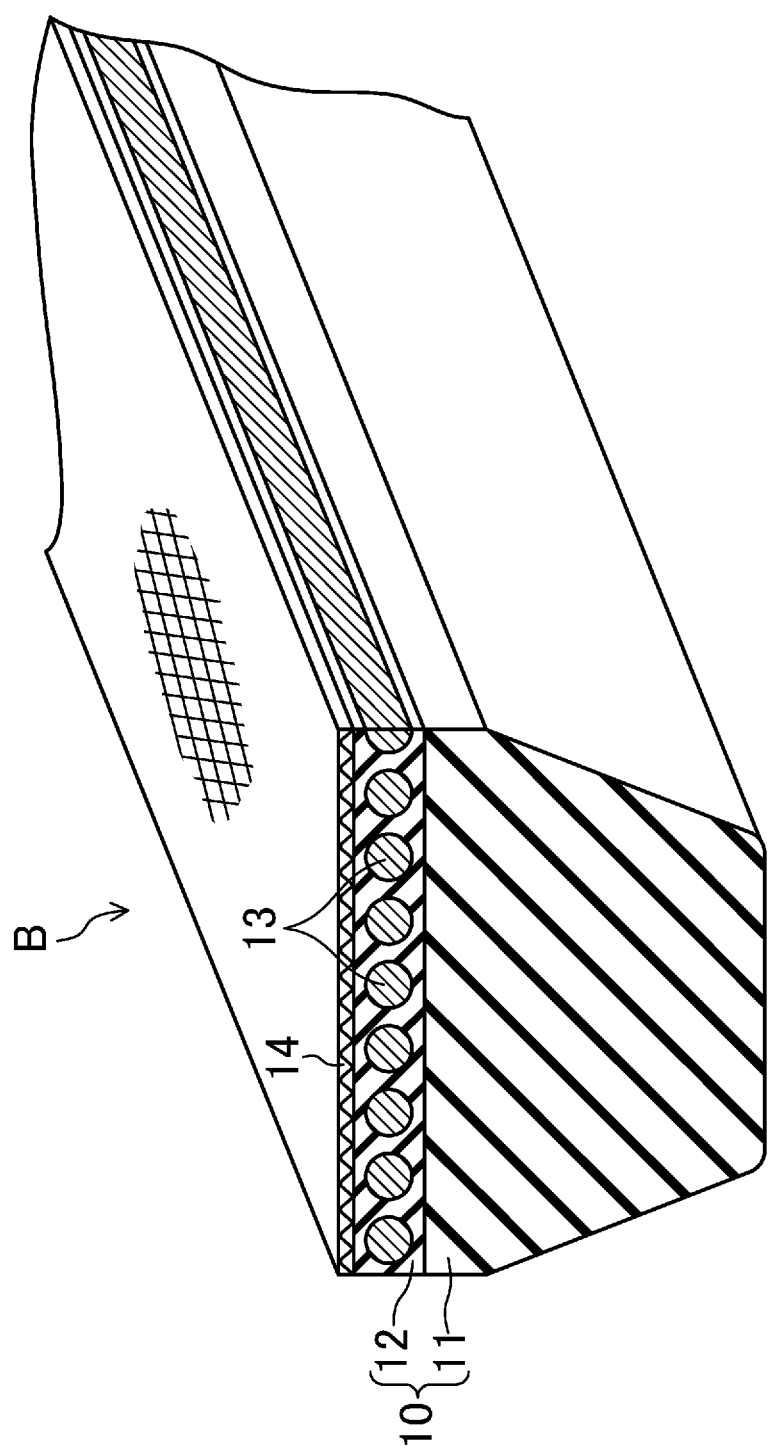
FIG. 1 is a perspective view of a raw edge V-belt produced by a production method according to a first embodiment.

FIG. 1 shows a raw edge V-belt B produced by a production method according to a first embodiment. The raw edge V-belt B is usable as a power transmission member for various machines. For example, the raw edge V-belt B has a length of 500 mm to 3000 mm, a width of 7.5 mm to 32 mm, and a thickness of 5.5 mm to 20 mm.

The raw edge V-belt B of the first embodiment is comprised of a rubber-made belt body 10 including a compressed rubber layer 11 which forms an inner peripheral side, in the thickness direction, of the belt B and an adhesive rubber layer 12 which forms an outer peripheral side, in the thickness direction, of the belt B. A cord 13 is embedded in a middle portion, in the thickness direction, of the adhesive rubber layer 12. The cord 13 forms, in the adhesive rubber layer 12, a helical pattern having pitches in the width direction. A reinforcing fabric 14 is attached to the outer side of the adhesive rubber layer 12, i.e., the back face of the belt. The raw edge V-belt B is configured such that the reinforcing fabric 14, the adhesive rubber layer 12, and an upper portion of the compressed rubber layer 11, which together constitute an outer side portion of the belt B, have the same width. This means that the side surfaces of that portion are perpendicular to the back face of the belt. The other portion of the belt B which constitutes an inner side portion of the belt B, i.e., a lower portion of the compressed rubber layer 11, is configured to have a smaller width toward the inner side. This means that the side surfaces, in the width direction, of that portion are inclined surfaces which are angled inward with respect to the back face of the belt toward the inner side. Note that the raw edge V-belt B may include a stretch rubber layer instead of the reinforcing fabric 14. Thus, the rubber-made belt body may include the compressed rubber layer, the adhesive rubber layer, and the stretch rubber layer.

The compressed rubber layer 11 and the adhesive rubber layer 12 are each made of a crosslinked rubber composition which is produced through heating and pressing of an uncrosslinked rubber composition prepared by kneading a blend of a rubber component and various compound ingredients. The compressed rubber layer 11 and the adhesive rubber layer 12 may be made of the same rubber composition.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One of these substances or a blend of two or more of these substances is suitably used as the rubber component. Examples of the compound ingredients include a reinforcing material (such as a carbon black), a filler, a plasticizer, a processing aid, a crosslinking agent, a co-crosslinking agent, a vulcanization accelerator, a vulcanization accelerator aid, and an antioxidant. Apart from the foregoing ingredients, examples of the compound ingredients which can be blended with the rubber composition making the compressed rubber layer 11 include surface texture modifiers such as short fibers, fluororesin powder, polyethylene resin powder, hollow particles, and a foaming agent.

The cord 13 is made of a twisted yarn of fibers, such as polyester fibers, polyethylene naphthalate fibers, aramid fibers, and vinylon fibers. The cord 13 has undergone an adhesion treatment to be adhesive to the adhesive rubber layer 12 of the belt body 10.

The reinforcing fabric 14 is comprised of a woven, knitted, or unwoven fabric made of nylon fibers, polyester fibers, aramid fibers, or cotton, for example. The reinforcing fabric 14 has undergone an adhesion treatment to be adhesive to the adhesive rubber layer 12 of the belt body 10.

(Production Method 1-1)

A production method 1-1 for producing the raw edge V-belt B according to the first embodiment will be described with reference to FIGS. 2 to 9.

The production method 1-1 includes a component preparation step, a shaping step, a crosslinking step, and a finishing step.

<Component Preparation Step>

In the component preparation step, a compressed rubber sheet 11' which is to constitute a compressed rubber layer 11, an adhesive rubber sheet 12' which is to constitute an adhesive rubber layer 12, a cord 13', and a reinforcing fabric 14' are prepared.

Compressed Rubber Sheet 11'

A rubber component and compound ingredients are kneaded together by using a kneading machine such as a kneader or a Banbury mixer to obtain an uncrosslinked rubber composition. The uncrosslinked rubber composition is formed into a thick uncrosslinked rubber sheet 11" by calender molding, etc. The compressed rubber sheet 11' is then prepared from the uncrosslinked rubber sheet 11".

Figure 2:
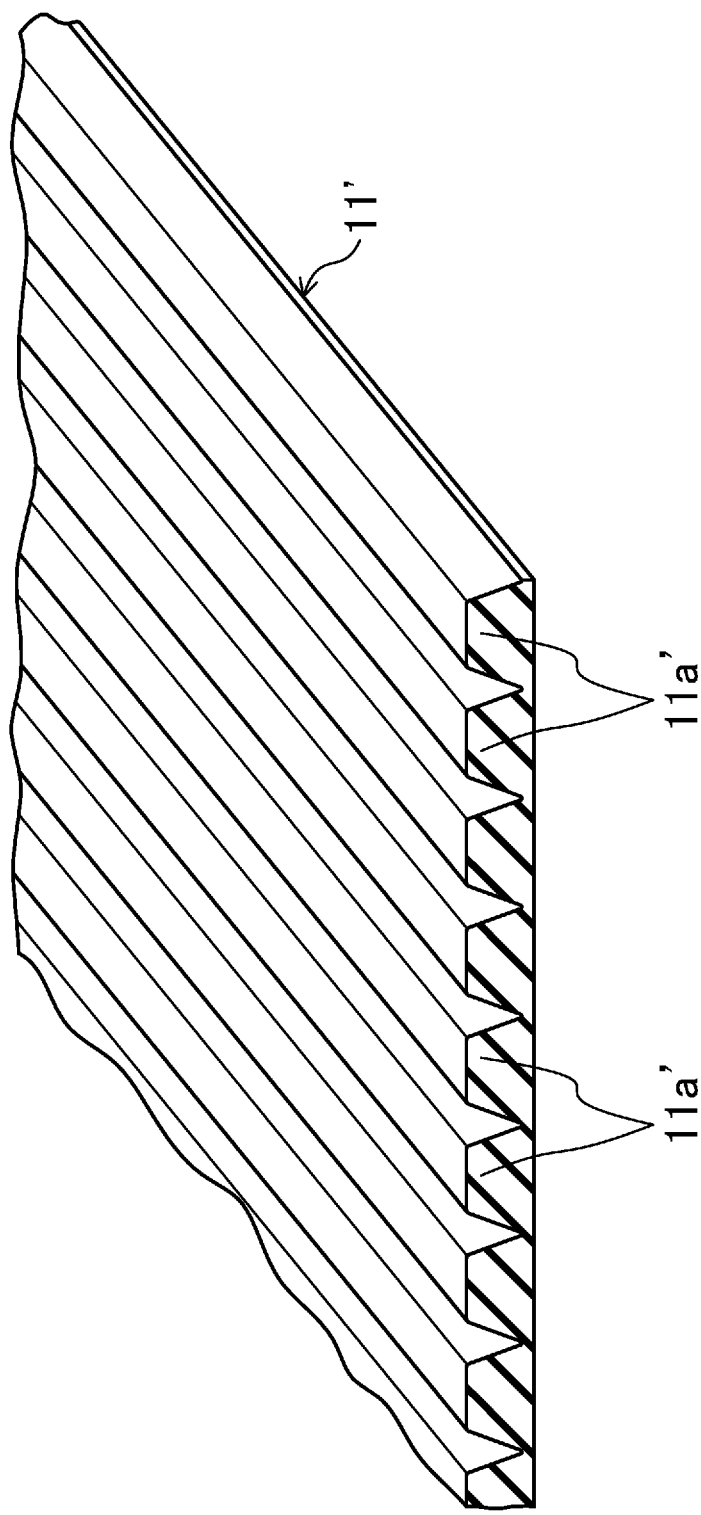
FIG. 2 is a perspective view of a compressed rubber sheet for use in a production method 1-1 of the first embodiment.

FIG. 2 illustrates the compressed rubber sheet 11'.

The compressed rubber sheet 11' has, on one of the surfaces, a plurality of compressed rubber layer-forming portions 11a', which are linearly-extending ridges and extend parallel to one another. The compressed rubber sheet 11' is formed into a shape which looks like a collection of a plurality of compressed rubber layers 11 each for use in a raw edge V-belt B to be produced, wherein the compressed rubber layers 11 are arranged side by side and connected together such that adjacent compressed rubber layers 11 are coupled to each other on the sides. This means that the plurality of compressed rubber layer-forming portions 11a' have the same shape. Each compressed rubber layer-forming portion 11a' has a width decreasing toward its distal end. Specifically, each compressed rubber layer-forming portion 11a' is shaped to have a cross section in an isosceles trapezoidal shape. The size of the compressed rubber layer-forming portion 11a' may be the same as, or somewhat larger than, the size of the compressed rubber layer 11 of the raw edge V-belt B to be produced.

Figure 3A:
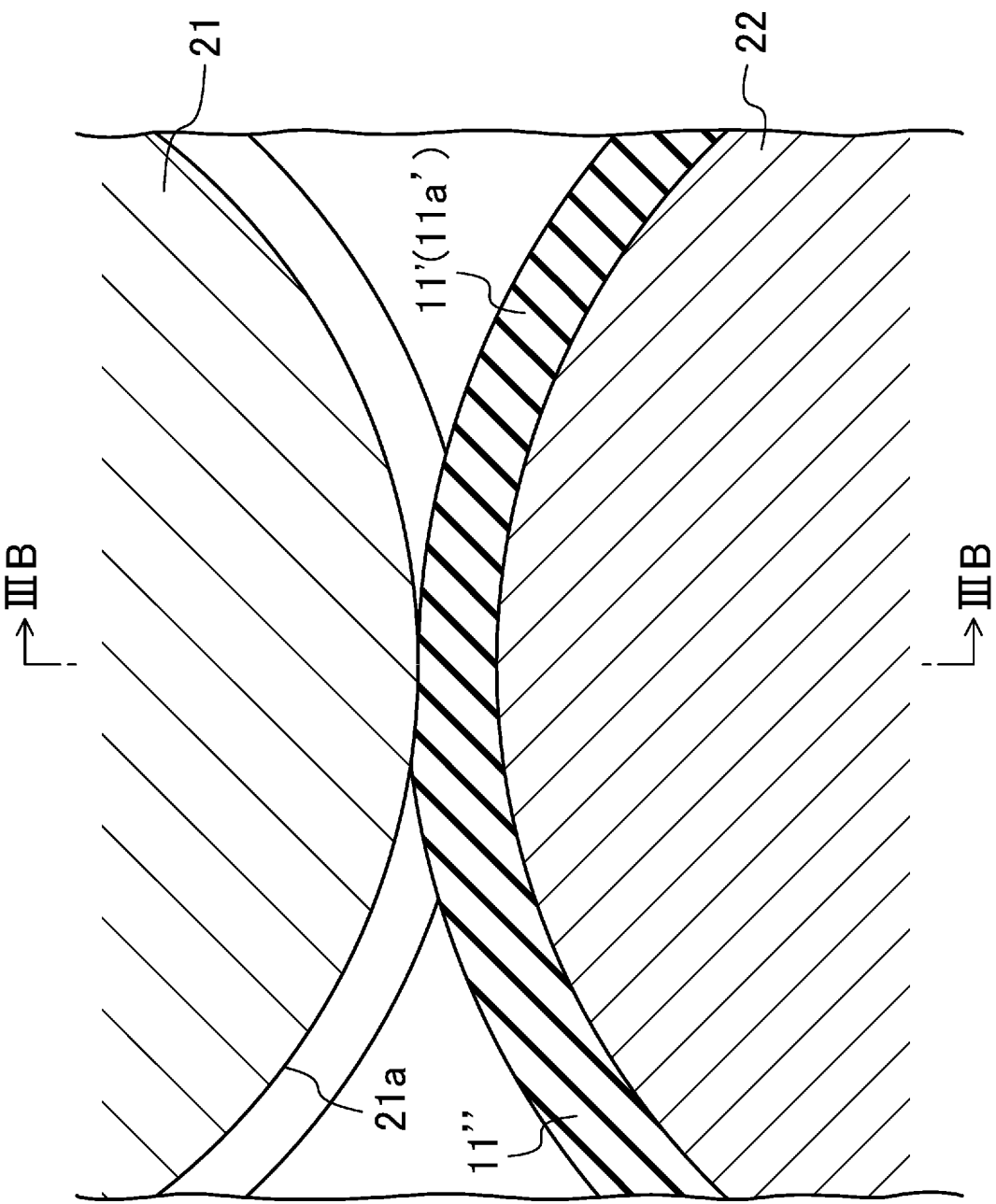
FIG. 3A is a diagram for showing how to prepare the compressed rubber sheet in a component preparation step in the production method 1-1 of the first embodiment.
Figure 3B:
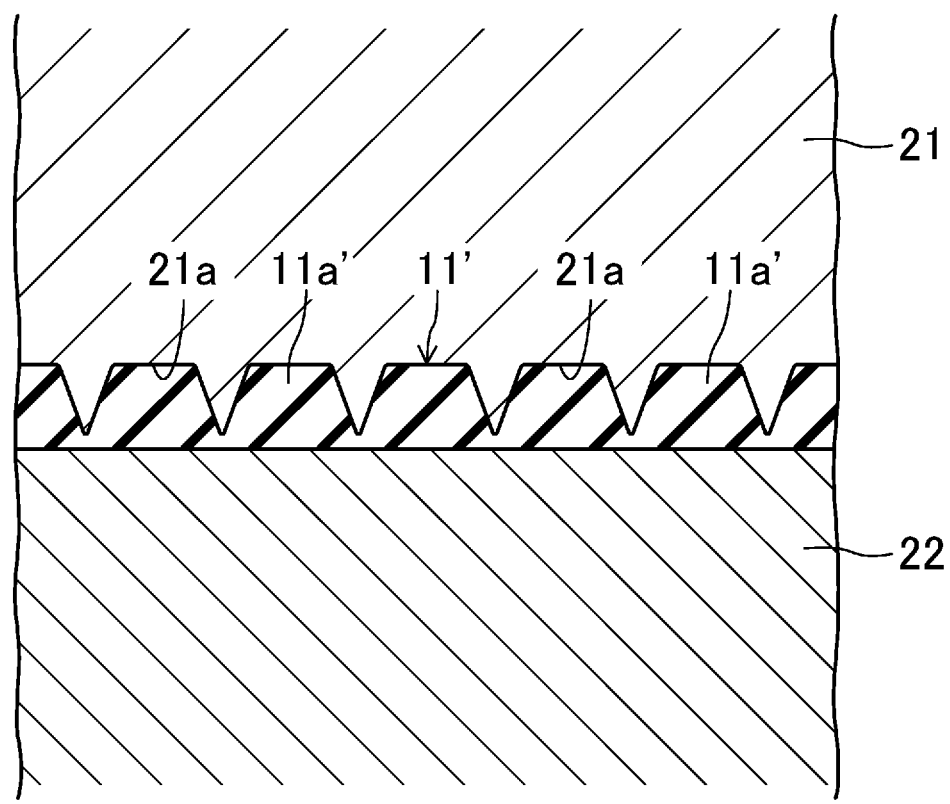
FIG. 3B is a cross-sectional view taken along line IIIB-IIIB of FIG. 3A.

The compressed rubber sheet 11' can be prepared in the following manner. As shown in FIGS. 3A and 3B, the uncrosslinked rubber sheet 11" is passed between a flat roll 22 and a compressed rubber-shaping roll 21 having trapezoidal grooves 21a that have a shape corresponding to the shape of the compressed rubber layer-forming portions 11a' of the compressed rubber sheet 11', extend in the circumferential direction, and are arranged adjacent to each other in the axial direction of the compressed rubber-shaping roll 21. In this manner, the trapezoidal grooves 21a on the outer peripheral surface of the compressed rubber-shaping roll 21 are pressed onto one of the surfaces of the uncrosslinked rubber sheet 11", thereby forming the compressed rubber layer-forming portions 11a'. The uncrosslinked rubber sheet 11" may be heated to increase the plasticity of the uncrosslinked rubber sheet 11". The compressed rubber sheet 11' can also be prepared by press molding or extrusion molding.

Adhesive Rubber Sheet 12'

A rubber component and compound ingredients are kneaded together by using a kneading machine such as kneader or a Banbury mixer to obtain an uncrosslinked rubber composition (a third uncrosslinked rubber composition). The uncrosslinked rubber composition is molded by calender molding or the like, into a sheet, i.e., the adhesive rubber sheet 12'.

Cord 13'

A twisted yarn to form a cord 13' undergoes an adhesion treatment in which the twisted yarn is soaked in an RFL aqueous solution and heated, and/or an adhesion treatment in which the twisted yarn is soaked in rubber cement and dried. The twisted yarn may undergo, prior to these adhesion treatments, a base treatment in which the twisted yarn is soaked in an epoxy resin solution or an isocyanate resin solution and heated.

Reinforcing Fabric 14'

A woven fabric or a fabric of any other type which is to constitute a reinforcing fabric 14 undergoes one kind or two or more kinds of the following treatments: an adhesion treatment in which the fabric is soaked in an RFL aqueous solution and heated; an adhesion treatment in which the fabric is soaked in rubber cement and dried; and an adhesion treatment in which rubber cement is applied to a surface of the fabric to face the belt body 10 and dried. The fabric may undergo, prior to these adhesion treatments, a base treatment in which the twisted yarn is soaked in an epoxy resin solution or an isocyanate resin solution and heated. In the case where a stretch rubber layer is provided instead of the reinforcing fabric 14, a stretch rubber sheet to constitute the stretch rubber layer is prepared in a similar manner to the adhesive rubber sheet 12'.

<Shaping Step>

Figure 4A:
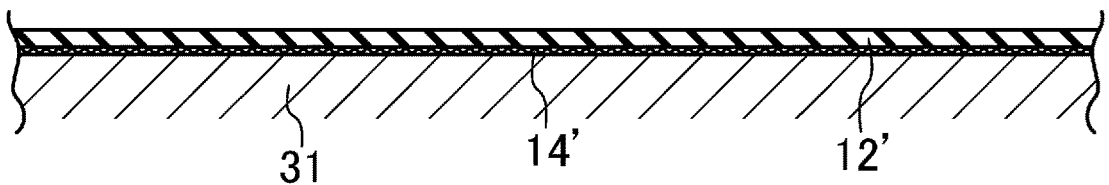
FIG. 4A is a first diagram for showing a shaping step of the production method 1-1 of the first embodiment.

In the shaping step, first, a shaping mandrel 31 having a cylindrical shape is rotatably supported on a shaft of a shaping machine (not shown) such that the axis of the shaping mandrel 31 extends horizontally. As shown in FIG. 4A, a reinforcing fabric 14' is wrapped around the shaping mandrel 31, and then, the adhesive rubber sheet 12' is wrapped around the reinforcing fabric 14'. The shaping mandrel 31 is chosen so as to correspond to the length of the raw edge V-belt B to be produced. In this step, the adhesive rubber sheet 12' is stacked on the reinforcing fabric 14'. Each of the reinforcing fabric 14' and the adhesive rubber sheet 12' is cut with an ultrasound cutter, air scissors, or the like, and its ends are lap jointed together. Alternatively, a reinforcing fabric 14' having a predetermined length may be formed into a cylindrical shape through joining of its both ends, and this cylindrical reinforcing fabric 14' may be fitted over the shaping mandrel 31. Alternatively, a reinforcing fabric 14' and an adhesive rubber sheet 12' may be stacked on and integrated with each other into a layered structure, and then, this layered structure may be wrapped around the shaping mandrel 31. Alternatively, the layered structure having a predetermined length may be formed into a cylindrical shape through joining of its both ends such that the adhesive rubber layer 12 faces outside, and the resultant cylindrical structure may be fitted over the shaping mandrel 31. In the case of providing a stretch rubber layer, a stretch rubber sheet is used instead of the reinforcing fabric 14', and the shaping step is carried out in a similar manner.

Figure 4B:
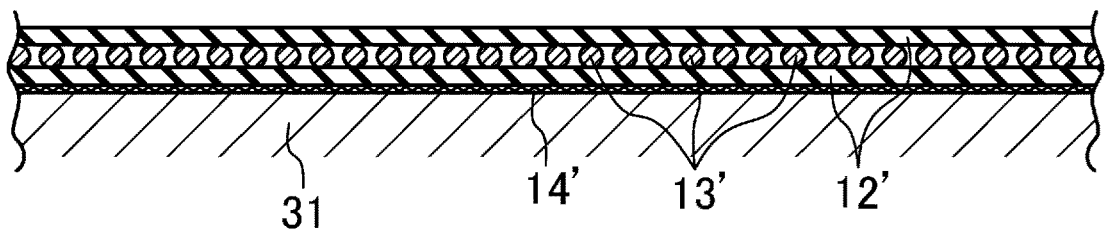
FIG. 4B is a second diagram for showing the shaping step of the production method 1-1 of the first embodiment.

Subsequently, as shown in FIG. 4B, a cord 13' is helically wound around the adhesive rubber sheet 12'. Another adhesive rubber sheet 12' is then wrapped over the wound cord 13'. Thus, a layer of the cord 13' is stacked on the adhesive rubber sheet 12', and the other adhesive rubber sheet 12' is stacked on the layer of the cord 13'. The adhesive rubber sheet 12' is cut with an ultrasound cutter, air scissors, or the like, and its ends are lap jointed together.

Figure 4C:
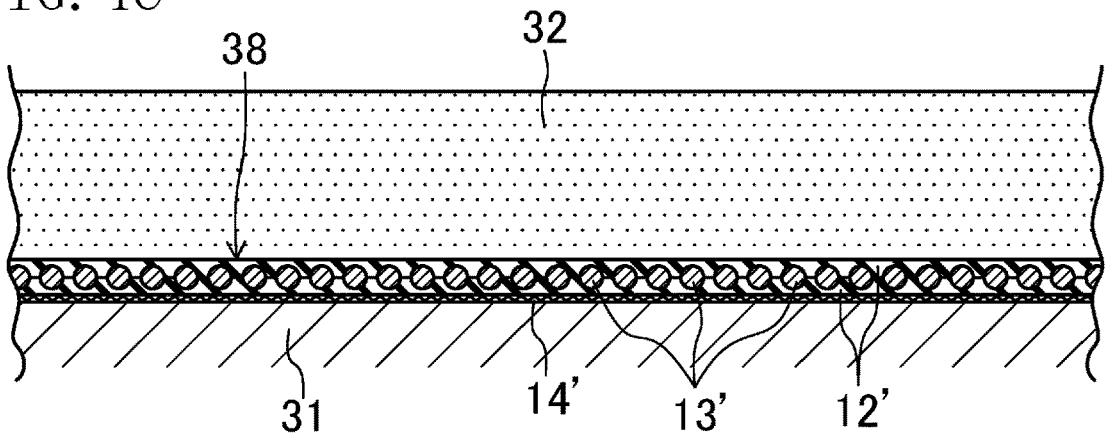
FIG. 4C is a third diagram for showing the shaping step of the production method 1-1 of the first embodiment.

Subsequently, as shown in FIG. 4C, the entire circumferential surface of the adhesive rubber sheet 12' is pressed with a roller 32. At this moment, the rubber flows and enters between turns of the cord 13', and the cord 13' is embedded between the pair of adhesive rubber sheets 12' so as to be fixed in position. As a result, these components are all integrated into a cylindrical tensile member 38. This operation may be carried out simultaneously with the wrapping of the adhesive rubber sheet 12' around the layer of the cord 13'.

Figure 4D:
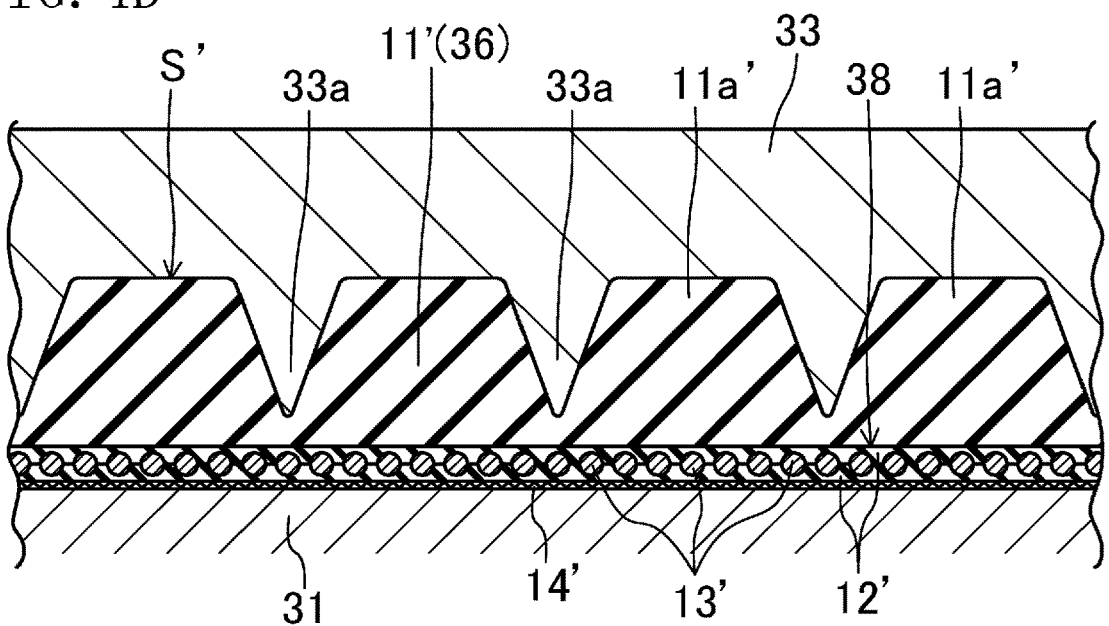
FIG. 4D is a fourth diagram for showing the shaping step of the production method 1-1 of the first embodiment.

Then, as shown in FIG. 4D, the compressed rubber layer 11' is wrapped around the adhesive rubber sheet 12' of the tensile member 38 such that the compressed rubber layer-forming portions 11a' face outside and extend in the circumferential direction, thereby forming an uncrosslinked slab S'. At this moment, a comb-shaped guide 33 having a shape corresponding to the compressed rubber layer-forming portions 11a' of the compressed rubber sheet 11' is set outside the shaping mandrel 31 such that the guide 33 extends in the axial direction and such that comb teeth 33a of the guide 33 face the shaping mandrel 31. Each of the compressed rubber layer-forming portions 11a' of the compressed rubber sheet 11' is guided between an associated pair of the comb teeth 33a, so that the compressed rubber sheet 11' is wrapped around, and stacked on, the adhesive rubber sheet 12', with the compressed rubber layer-forming portions 11a' extending in the circumferential direction with high precision. The compressed rubber sheet 11' is cut with an ultrasound cutter or the like, and its ends are butt jointed. To increase the joint strength, the butt joint is suitably achieved by abutting surfaces, of the compressed rubber sheet 11', which are oblique with respect to the thickness direction of the compressed rubber sheet 11'. Alternatively, a compressed rubber sheet 11' having a predetermined length may be formed into a cylindrical shape with its both ends joined together such that the compressed rubber layer-forming portions 11a' face outside, and this cylindrical compressed rubber sheet 11' may be fitted over the adhesive rubber sheet 12'. The cylindrical compressed rubber sheet 11' constitutes a shaped structure 36 which has a cylindrical shape. The shaped structure 36 is made of the uncrosslinked rubber composition and has, on its outer peripheral surface, the compressed rubber layer-forming portions 11a' which are the plurality of ridges extending in the circumferential direction and which are arranged adjacent to each other in the axial direction.

In the manner described above, an uncrosslinked slab S' having a cylindrical shape is formed on the shaping mandrel 31. The uncrosslinked slab S' includes the reinforcing fabric 14', the adhesive rubber sheet 12', the cord 13', the other adhesive rubber sheet 12', and the compressed rubber sheet 11' that are sequentially stacked toward the outside. The uncrosslinked slab S' includes the shaped structure 36 having a cylindrical shape. The number of the compressed rubber layer-forming portions 11a' included in the uncrosslinked slab S' is 20 to 100, for example.

<Crosslinking Step>

Figure 5A:
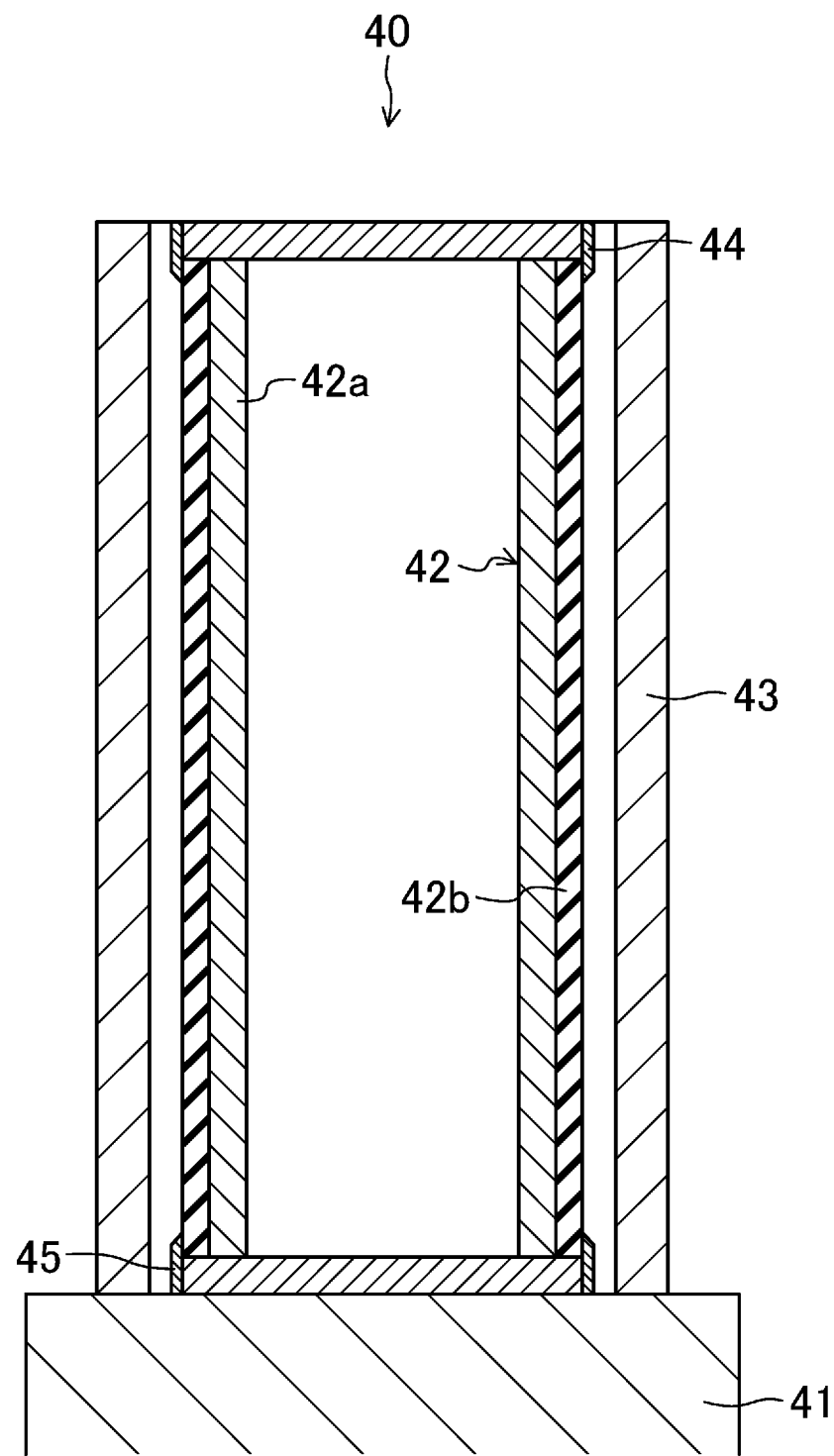
FIG. 5A is a cross-sectional view of a crosslinking apparatus.
Figure 5B:
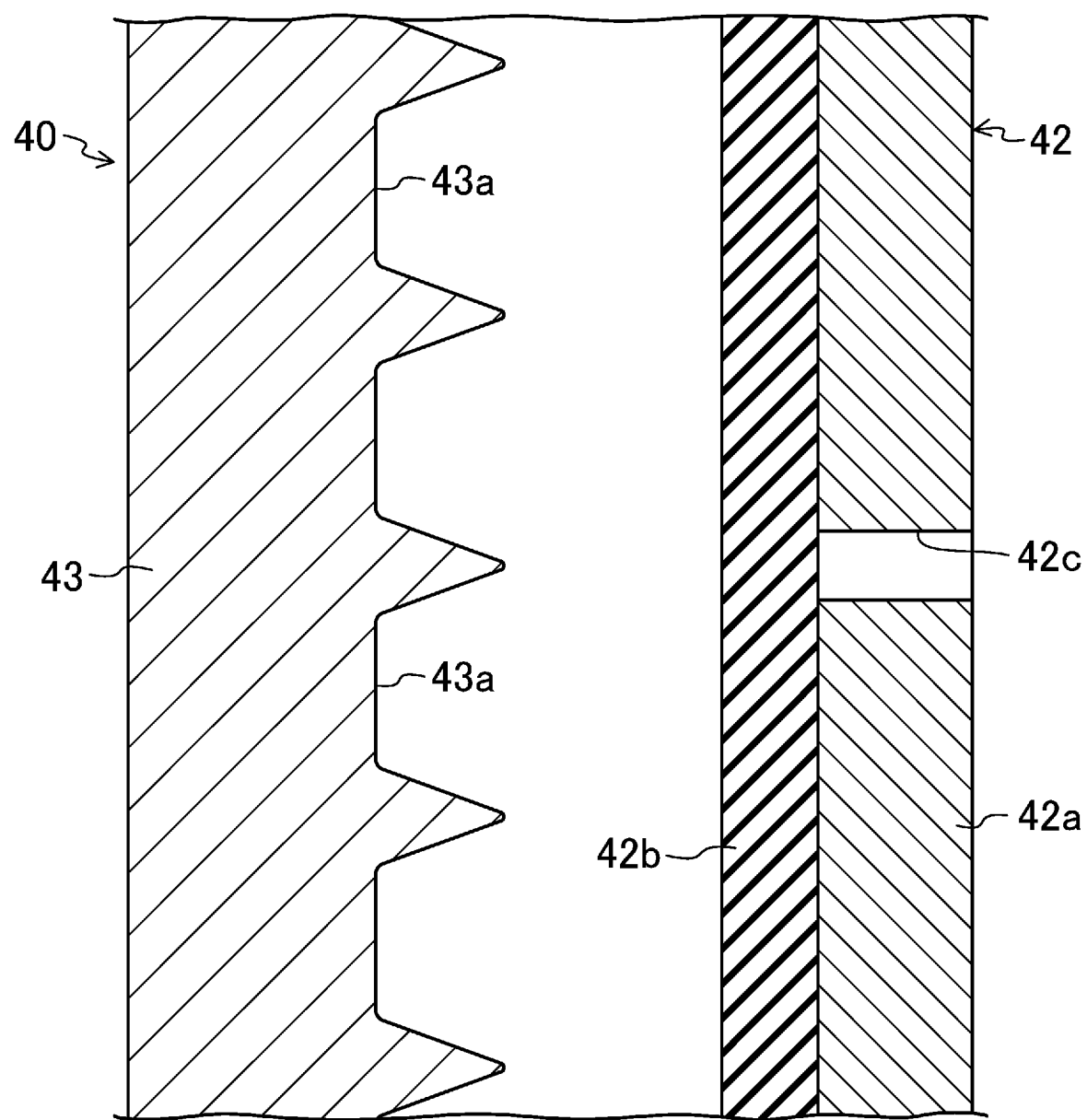
FIG. 5B shows, on an enlarged scale, a cross section of a portion of the crosslinking apparatus.

FIGS. 5A and 5B illustrate a crosslinking apparatus 40 for use in a crosslinking step.

The crosslinking apparatus 40 includes a base 41, a columnar expansion drum 42 standing on the base 41, a cylindrical mold 43 (belt mold) provided outside the expansion drum 42.

The expansion drum 42 includes a drum body 42a having a hollow columnar shape, and a cylindrical expansion sleeve 42b made of rubber and externally fitted over the outer periphery of the drum body 42a. The drum body 42a has, in its peripheral wall, a large number of air-passage holes 42c communicating with the inside. The expansion sleeve 42b and the drum body 42a are sealed by fixing rings 44 and 45 at both ends of the expansion sleeve 42b and the drum body 42a. The crosslinking apparatus 40 includes a pressurizing means (not shown) for applying a pressure by introducing high-pressure air into the drum body 42a. The high-pressure air introduced into the drum body 42a by the pressurizing means passes through the air-passage holes 42c to enter between the drum body 42a and the expansion sleeve 42b, and inflates the expansion sleeve 42b radially outward.

The cylindrical mold 43 is attachable to, and detachable from, the base 41. The cylindrical mold 43 is attached to the base 41 such that the cylindrical mold 43 and the expansion drum 42 are arranged concentrically with each other with a space interposed therebetween. The cylindrical mold 43 has, on its inner peripheral surface, a plurality of compressed rubber layer-shape grooves 43a which extend in the circumferential direction and are arranged adjacent to each other in the axial direction (the groove width direction). Each compressed rubber layer-shape groove 43a has a width decreasing toward its groove bottom. Specifically, each compressed rubber layer-shape groove 43a has the same isosceles trapezoidal cross section as the compressed rubber layer 11 of the raw edge V-belt B to be produced. The crosslinking apparatus 40 includes a heating means and a cooling means (both are not shown) for the cylindrical mold 43, so that the temperature of the cylindrical mold 43 can be controlled by these heating and cooling means.

In the crosslinking step, the uncrosslinked slab S' is removed from the shaping mandrel 31, and then, placed inside the cylindrical mold 43 of the crosslinking apparatus 40, which has been previously detached from the base 41. More specifically, the uncrosslinked slab S' is set inside the cylindrical mold 43 such that each of the plurality of compressed rubber layer-forming portions 11a' of the uncrosslinked slab S' is fitted in an associated one of the compressed rubber layer-shape grooves 43a of the cylindrical mold 43. Fitting the compressed rubber layer-forming portions 11a' in the compressed rubber layer-shape grooves 43a in advance, prior to heating the uncrosslinked slab S' including the shaped structure 36 and pressing this uncrosslinked slab S' toward the cylindrical mold 43 (as will be described later), reduces stretch of the rubber, thereby enabling production of a raw edge V-belt B having a stable structure. The cylindrical mold 43 is chosen to correspond to the length of the raw edge V-belt B to be produced. Note that short fibers, resin powder, or the like may be attached to the inner peripheral surface of the cylindrical mold 43 and/or the outer peripheral surface of the uncrosslinked slab S' in advance.

Figure 6A:
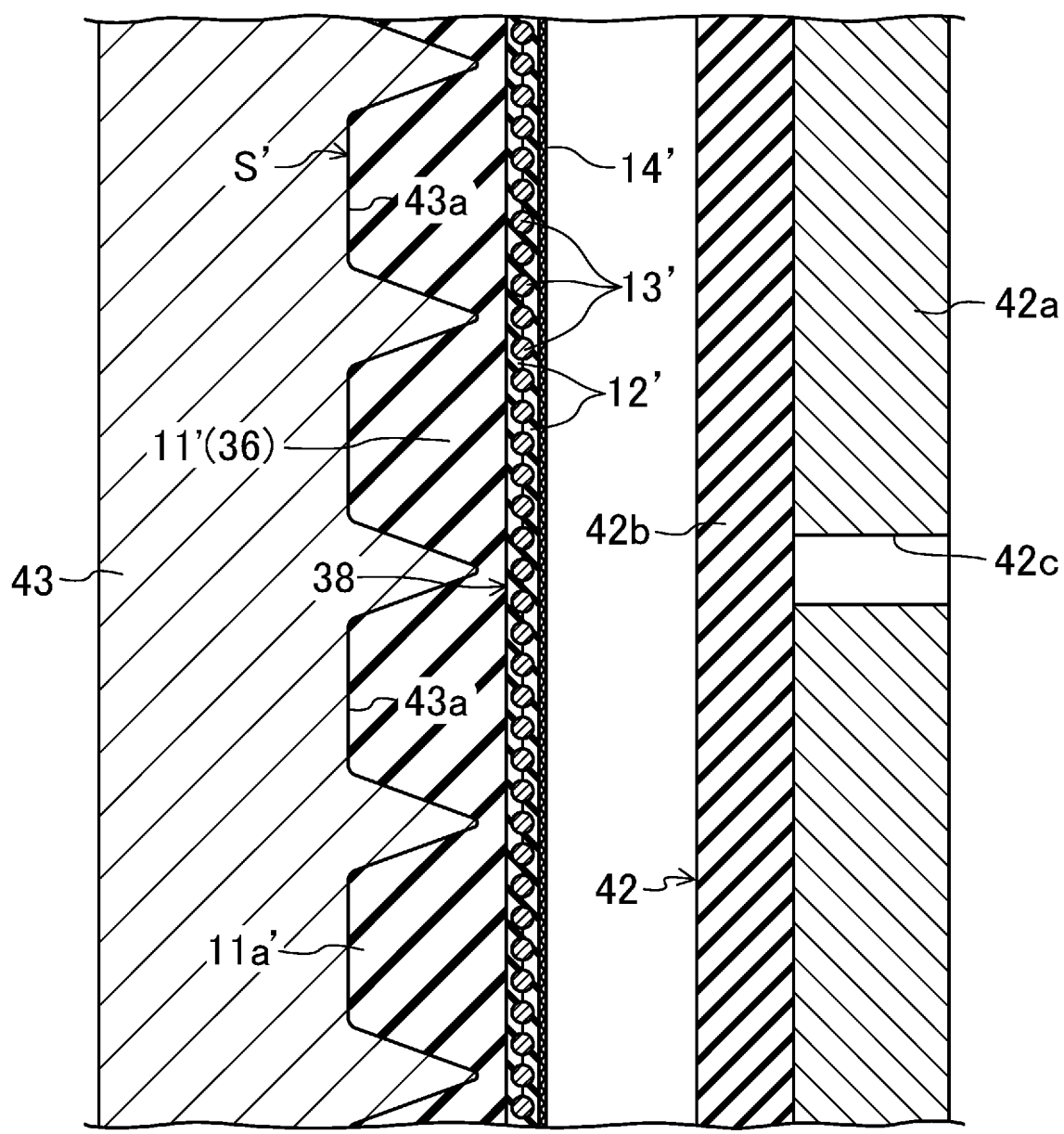
FIG. 6A is a first diagram for showing a crosslinking step of the production method 1-1 of the first embodiment.

Subsequently, as shown FIG. 6A, the cylindrical mold 43 within which the uncrosslinked slab S' has been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

Figure 6B:
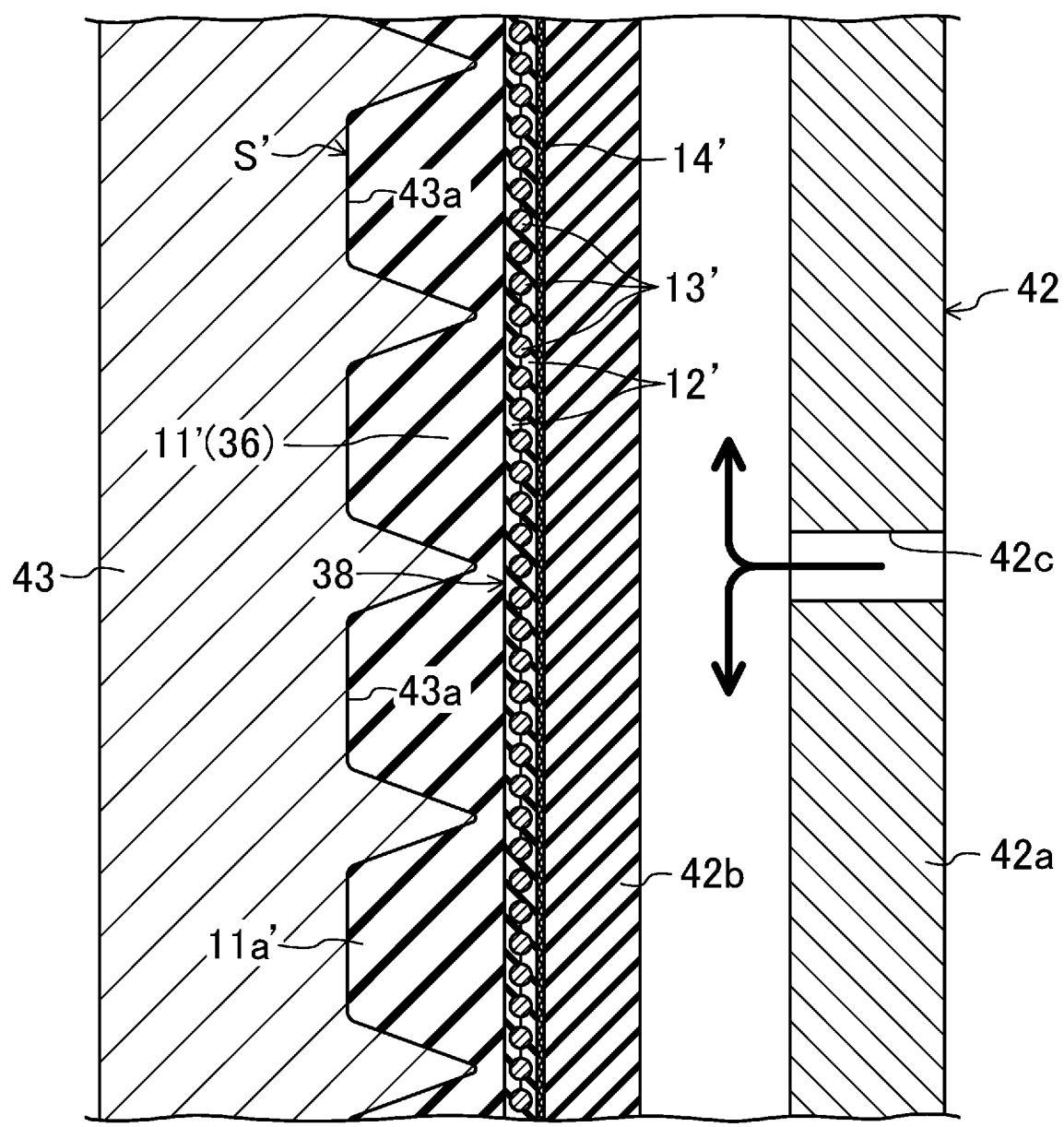
FIG. 6B is a second diagram for showing the crosslinking step of the production method 1-1 of the first embodiment.

As shown in FIG. 6B, the temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, while having each of the compressed rubber layer-forming portions 11a' fitted in the associated one of the compressed rubber layer-shape grooves 43a of the cylindrical mold 43, the uncrosslinked slab S' is heated by the cylindrical mold 43 and pressed against the cylindrical mold 43 by the expansion sleeve 42b. That is, the pressing of the shaped structure 36 toward the cylindrical mold 43 is carried out by expanding the expansion sleeve 42b, located radially inward of the shaped structure 36, and pressing the shaped structure 36 from radially inside. In addition, the rubber components contained in the compressed rubber sheet 11' and the adhesive rubber sheets 12' that are included in the uncrosslinked slab S' are crosslinked and integrated with one another. As a result, a continuous structure of belt bodies 10 for a plurality of raw edge V-belts B, each including the compressed rubber layer 11 and the adhesive rubber layer 12, is produced. At the same time, the rubber components adhere to, and are combined with, the cord 13' and the reinforcing fabric 14'. A cylindrical belt slab S is thus formed eventually. The heating is carried out at a temperature of 100° C. to 180° C., for example. The pressurization is carried out at a pressure of 0.5 MPa to 2.0 MPa, for example. The process continues for 10 minutes to 60 minutes, for example.

Figure 7:
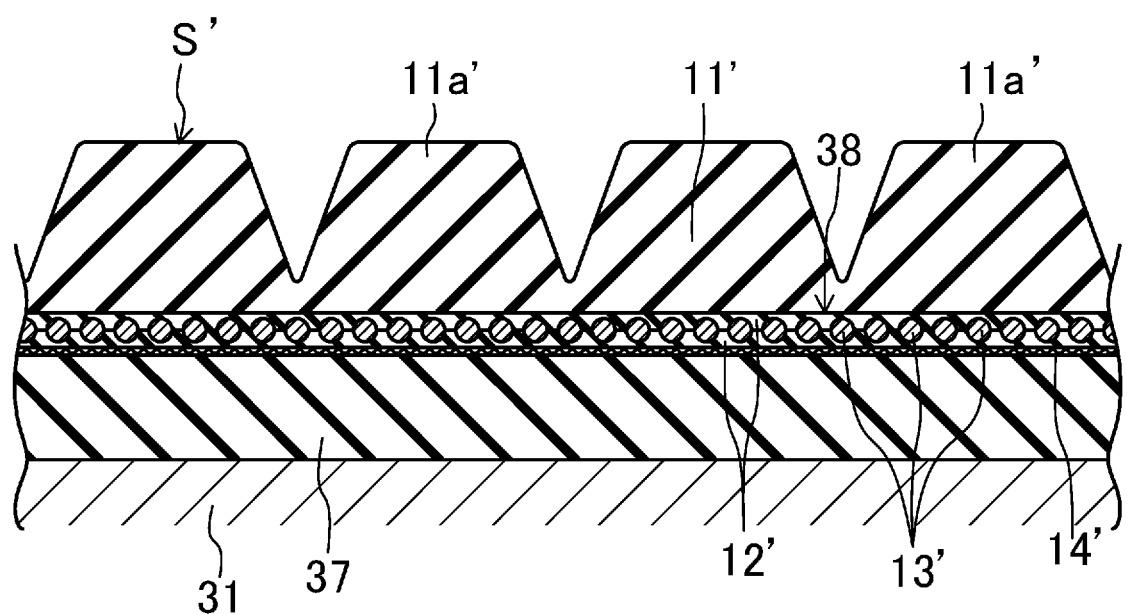
FIG. 7 is a diagram for showing a shaping step of a variation of the production method 1-1 of the first embodiment.
Figure 8:
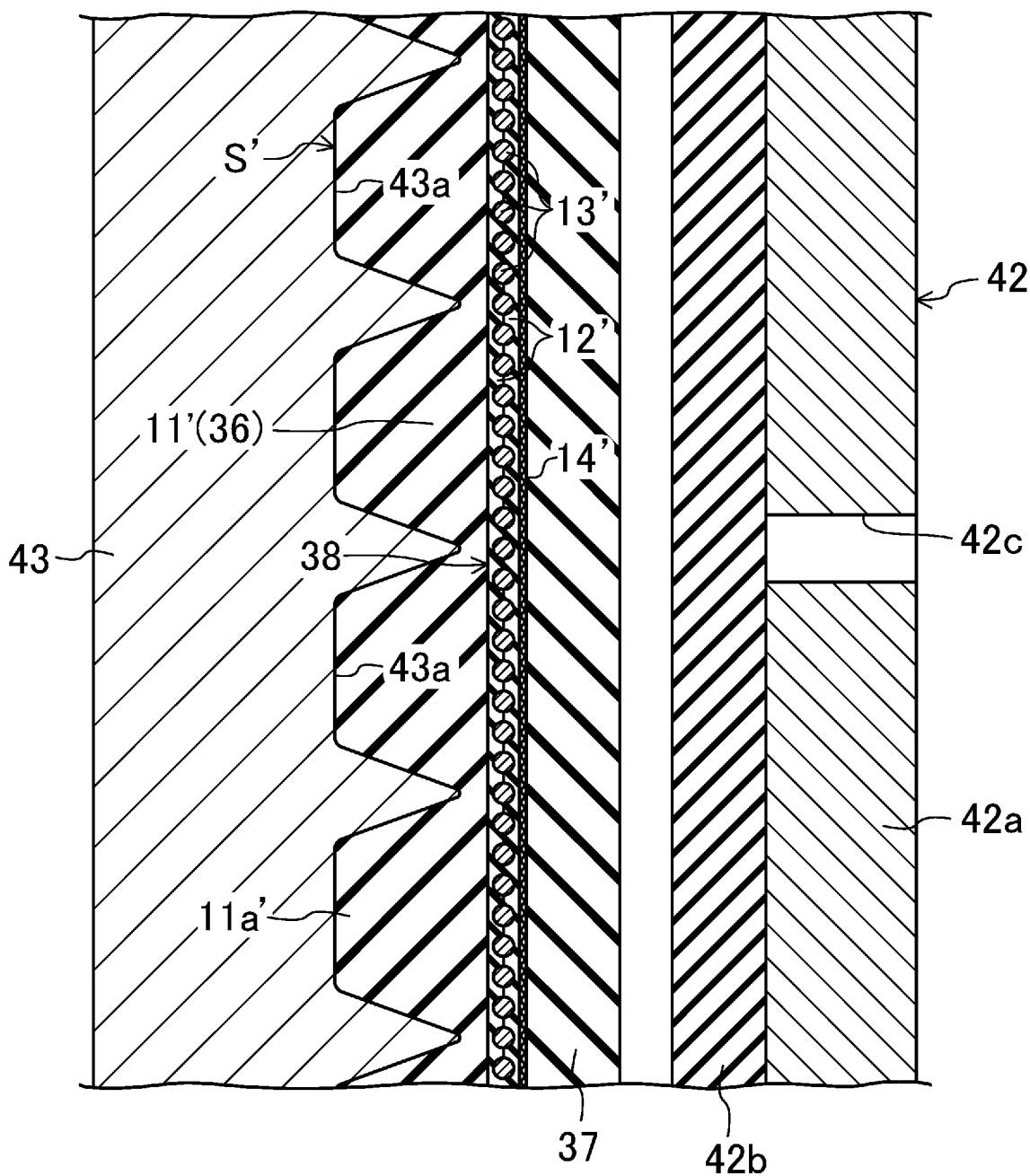
FIG. 8 is a diagram for showing a crosslinking step of the variation of the production method 1-1 of the first embodiment.

The shaping step may be performed such that as shown in FIG. 7, a rubber-made shaping sleeve 37 is fitted over the shaping mandrel 31 to form an uncrosslinked slab S' on the shaping sleeve 37. In the crosslinking step, the uncrosslinked slab S' and the shaping sleeve 37 are together removed from the shaping mandrel 31. The removed slab S' and sleeve 37 are then set inside the cylindrical mold 43, as shown in FIG. 8. In other words, the shaping sleeve 37 may be interposed between the expansion drum 42 and the uncrosslinked slab S'.

<Finishing Step>

In a finishing step, the pressure inside the drum body 42a applied by the pressurizing means is released. After the cylindrical mold 43 is cooled by the cooling means, the cylindrical mold 43 is detached from the base 41, and the belt slab S that has been formed in the cylindrical mold 43 is removed from the cylindrical mold 43.

Figure 9:
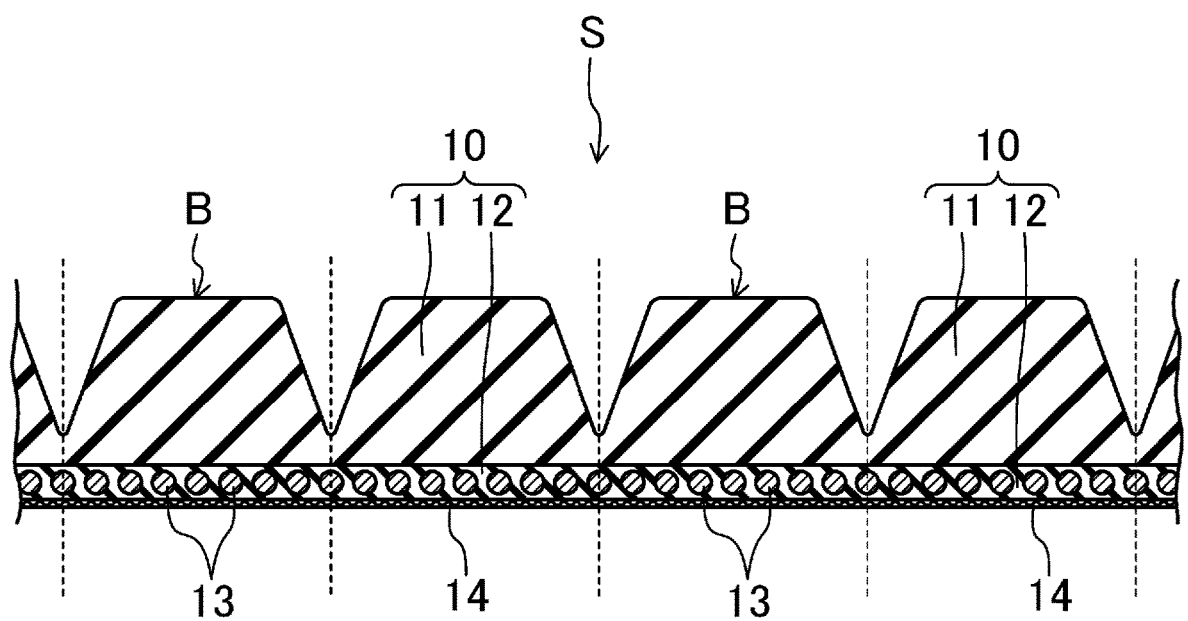
FIG. 9 is a diagram for showing a finishing step of the production method 1-1 of the first embodiment.

As shown in FIG. 9, the belt slab S that has been removed from the cylindrical mold 43 is cut into ring-shaped pieces such that one ring-shaped piece corresponds to one compressed rubber layer-forming portion 11a'. Each piece is turned inside out, thereby obtaining the raw edge V-belt B of the first embodiment. If necessary, a surface treatment such as grinding may be provided to the outer peripheral surface of the belt slab S before being cut into the ring-shaped pieces, or the surface, of the raw edge V-belt B, adjacent to the compressed rubber layer 11 after the cutting into the ring-shaped pieces.

According to the above-described production method 1-1 of the raw edge V-belt B, the uncrosslinked slab S' includes a shaped structure 36 made of the compressed rubber sheet 11' of the uncrosslinked rubber composition and having a cylindrical shape. The shaped structure 36 has, on its outer peripheral surface, the compressed rubber layer-forming portions 11a' which are the plurality of ridges extending in the circumferential direction and which are arranged adjacent to each other in the axial direction. The cylindrical mold 43 has, on its inner peripheral surface, a plurality of compressed rubber layer-shape grooves 43a which extend in the circumferential direction and are arranged adjacent to each other in the axial direction (the groove width direction). According to the production method 1-1, the shaped structure 36 included in the uncrosslinked slab S' is placed inside the cylindrical mold 43, and a cylindrical belt slab S is molded while the compressed rubber layer-forming portions 11a' (which are the plurality of ridges of the shaped structure 36, and will constitute the compressed rubber layer 11) is fitted in an associated one of the compressed rubber layer-shape grooves 43a of the cylindrical mold 43. The belt slab S is cut into ring-shaped pieces such that one ring-shaped piece corresponds to one compressed rubber layer-forming portion 11a', thereby producing the raw edge V-belt B. Thus, no waste rubber is generated at least through the formation of inclined surfaces on both sides in the width direction of the belt. The generation of the waste rubber can thus be reduced to a small amount throughout the production steps of the raw edge V-belt B.

(Production Method 1-2)

A production method 1-2 will be described with reference to FIG. 10.

According to the production method 1-2, the compressed rubber sheet 11' is cut, in the shaping step, so as to have a length which corresponds to the length of the raw edge V-belt B to be produced. Ends of the compressed rubber sheet 11' are cut with an ultrasound cutter or the like, and are butt jointed with an ultrasound welder or the like such that the compressed rubber layer-forming portions 11a' face outside and extend in the circumferential direction. To increase the joint strength, the butt joint is suitably achieved by abutting surfaces, of the compressed rubber sheet 11', which are oblique with respect to the thickness direction of the compressed rubber sheet 11'. A shaped structure 36 which has a cylindrical shape is produced in this manner. The shaped structure 36 is made of the uncrosslinked rubber composition and has, on its outer peripheral surface, the plurality of compressed rubber layer-forming portions 11a' which are the ridges extending in the circumferential direction and arranged adjacent to each other in the axial direction.

Further, similarly to the steps of the production method 1-1 shown in FIGS. 4A to 4C, the reinforcing fabric 14', the adhesive rubber sheet 12', the cord 13', and another adhesive rubber sheet 12' are stacked on the shaping mandrel 31 in the stated order. After that, the entire circumferential surface of the stacked structure is pressed with a roller 32 on the adhesive rubber sheet 12' to integrate the stacked structure and produce a cylindrical tensile member 38.

Figure 10:
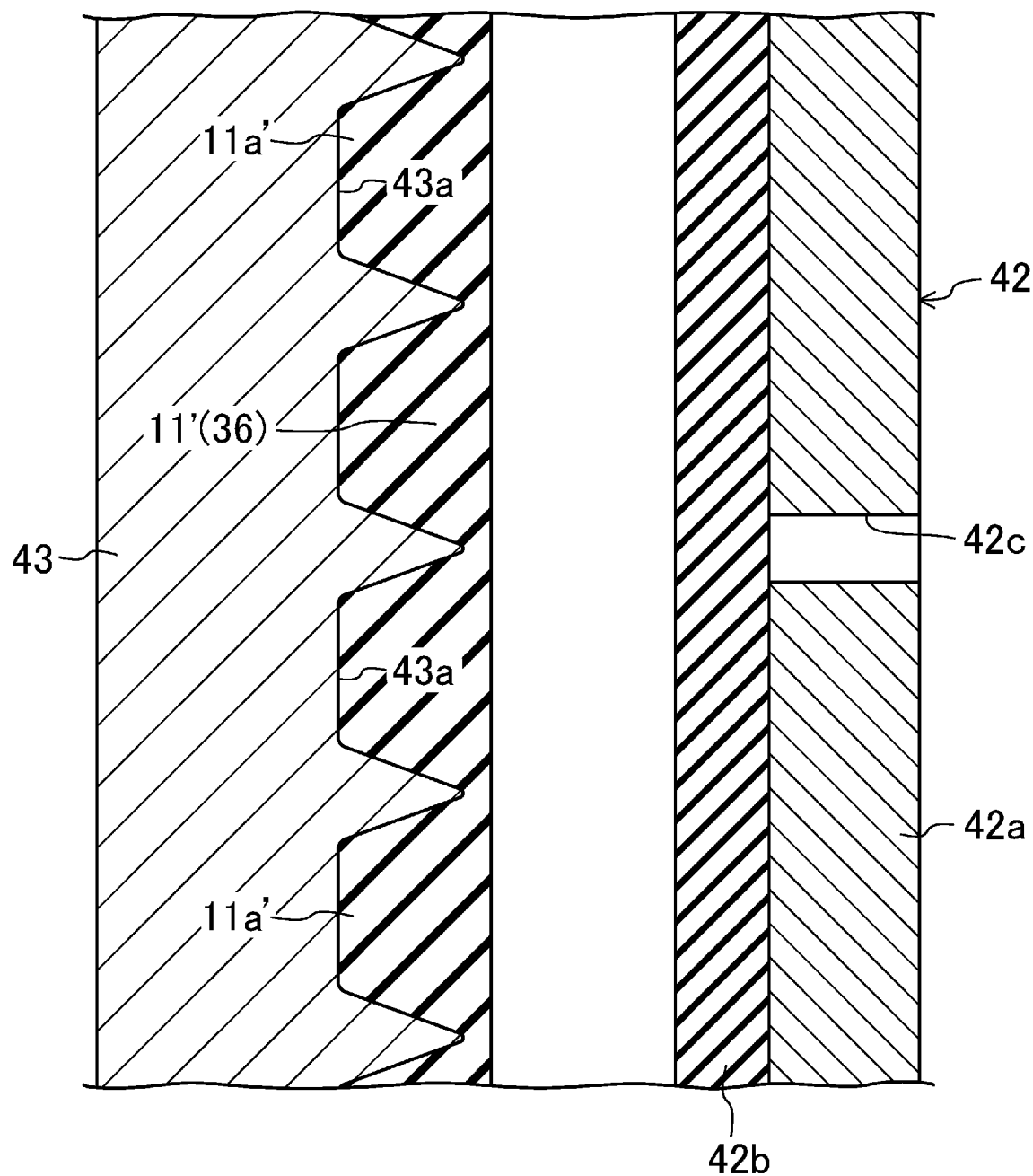
FIG. 10 is a diagram for showing a crosslinking step of a production method 1-2 of the first embodiment.

As shown in FIG. 10, the shaped structure 36 is placed inside the cylindrical mold 43 in the crosslinking step. More specifically, the shaped structure 36 is set inside the cylindrical mold 43 such that each of the plurality of compressed rubber layer-forming portions 11a' of the shaped structure 36 is fitted in an associated one of the compressed rubber layer-shape grooves 43a. Fitting the compressed rubber layer-forming portions 11a' in the compressed rubber layer-shape grooves 43a in advance, prior to heating the shaped structure 36 and pressing the shaped structure 36 toward the cylindrical mold 43 (as will be described later), reduces stretch of the rubber, thereby enabling production of a raw edge V-belt B having a stable structure. The cylindrical mold 43 is chosen to correspond to the length of the raw edge V-belt B to be produced. Note that short fibers, resin powder, or the like may be attached to the inner peripheral surface of the cylindrical mold 43 and/or the outer peripheral surface of the shaped structure 36 in advance.

Further, the tensile member 38 is detached from the shaping mandrel 31. The tensile member 38 is then fitted to the shaped structure 36 set in the cylindrical mold 43, such that the outer peripheral surface of the tensile member 38 comes into contact with the inner peripheral surface of the shaped structure 36, that is, so as to be in a similar positional relationship shown in FIG. 6A illustrating the production method 1-1.

Then, the cylindrical mold 43 within which the shaped structure 36 and the tensile member 38 have been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

Note that the compressed rubber sheet 11' may be fitted over the tensile member 38 to produce the uncrosslinked slab S'. This uncrosslinked slab S' may be placed inside the cylindrical mold 43.

Alternatively, the shaped structure 36 may be placed inside the cylindrical mold 43, and the tensile member 38 may be placed outside the expansion drum 42. In this case, a gap is formed between the shaped structure 36 set in the cylindrical mold 43 and the tensile member 38 set on the expansion drum 42. When the expansion sleeve 42b of the expansion drum 42 is expanded radially outward, the tensile member 38 expands radially outward and comes into contact with the shaped structure 36. The shaped structure 36 and the tensile member 38 in this state are heated by the cylindrical mold 43, and are pressed toward the cylindrical mold 43 by the expansion sleeve 42b. A belt slab S is formed as result. That is, the pressing of the shaped structure 36 toward the cylindrical mold 43 is carried out by expanding the expansion sleeve 42b, located radially inward of the shaped structure 36, and pressing the shaped structure 36 from radially inside.

The other features and advantages are the same as those of the production method 1-1.

(Production Method 1-3)

Figure 11:
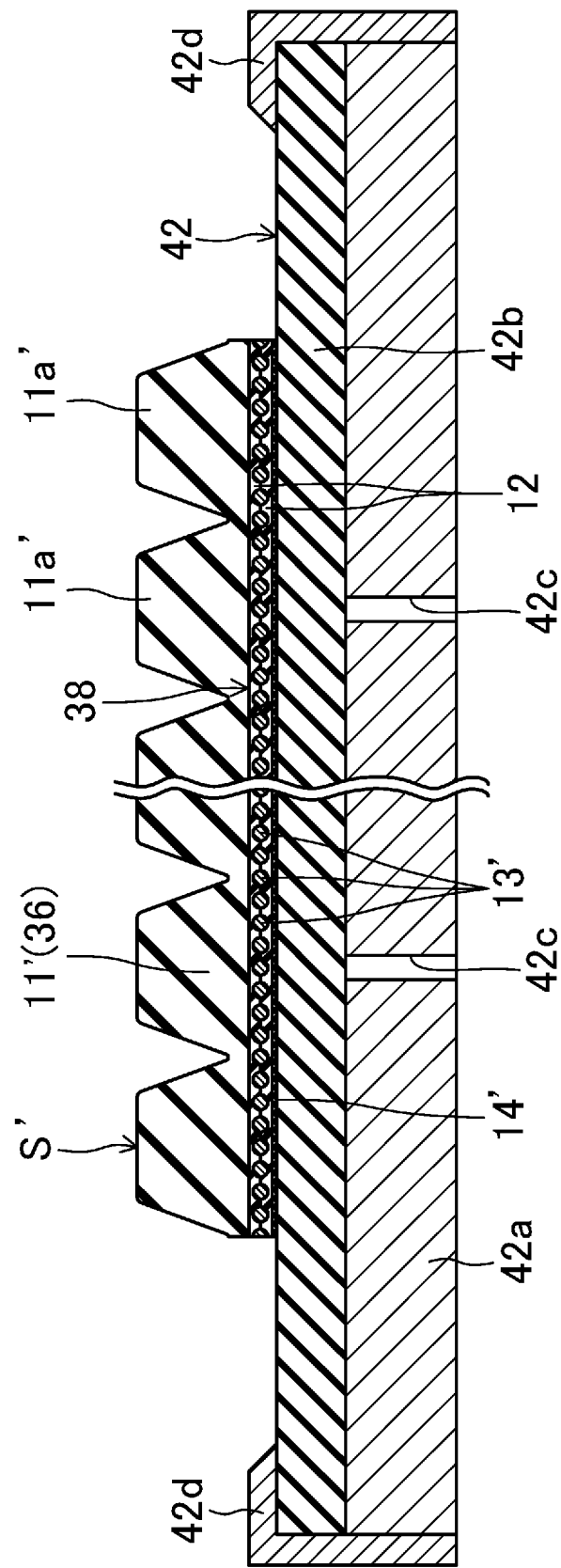
FIG. 11 is a diagram for showing a shaping step of a production method 1-3 of the first embodiment.

A production method 1-3 will be described with reference to FIGS. 11, 12A, and 12B.

According to the production method 1-3, a crosslinking apparatus 40 including an expansion drum 42 that is attachable to, and detachable from, a base 41 is used. The expansion drum 42 serves as a shaping mandrel. The expansion drum 42 includes a drum body 42a having a hollow columnar shape, and an expansion sleeve 42b made of rubber and externally fitted over the outer periphery of the drum body 42a. The expansion drum 42 has a basic configuration similar to the configuration of the expansion drum used in the production methods 1-1 and 1-2. Both ends of the expansion sleeve 42b are fixed to the drum body 42a by fixing rings 42d, and the expansion sleeve 42b and the drum body 42a are sealed at the both ends.

In the shaping step, the expansion drum 42 is rotatably supported on a shaft of a shaping machine (not shown) such that the axis of the expansion drum 42 extends horizontally. As shown in FIG. 11, similarly to the production method 1-1, the reinforcing fabric 14', the adhesive rubber sheet 12', the cord 13', another adhesive rubber sheet 12', and the compressed rubber sheet 11' are stacked on the expansion drum 42, thereby forming an uncrosslinked slab S'.

Figure 12A:
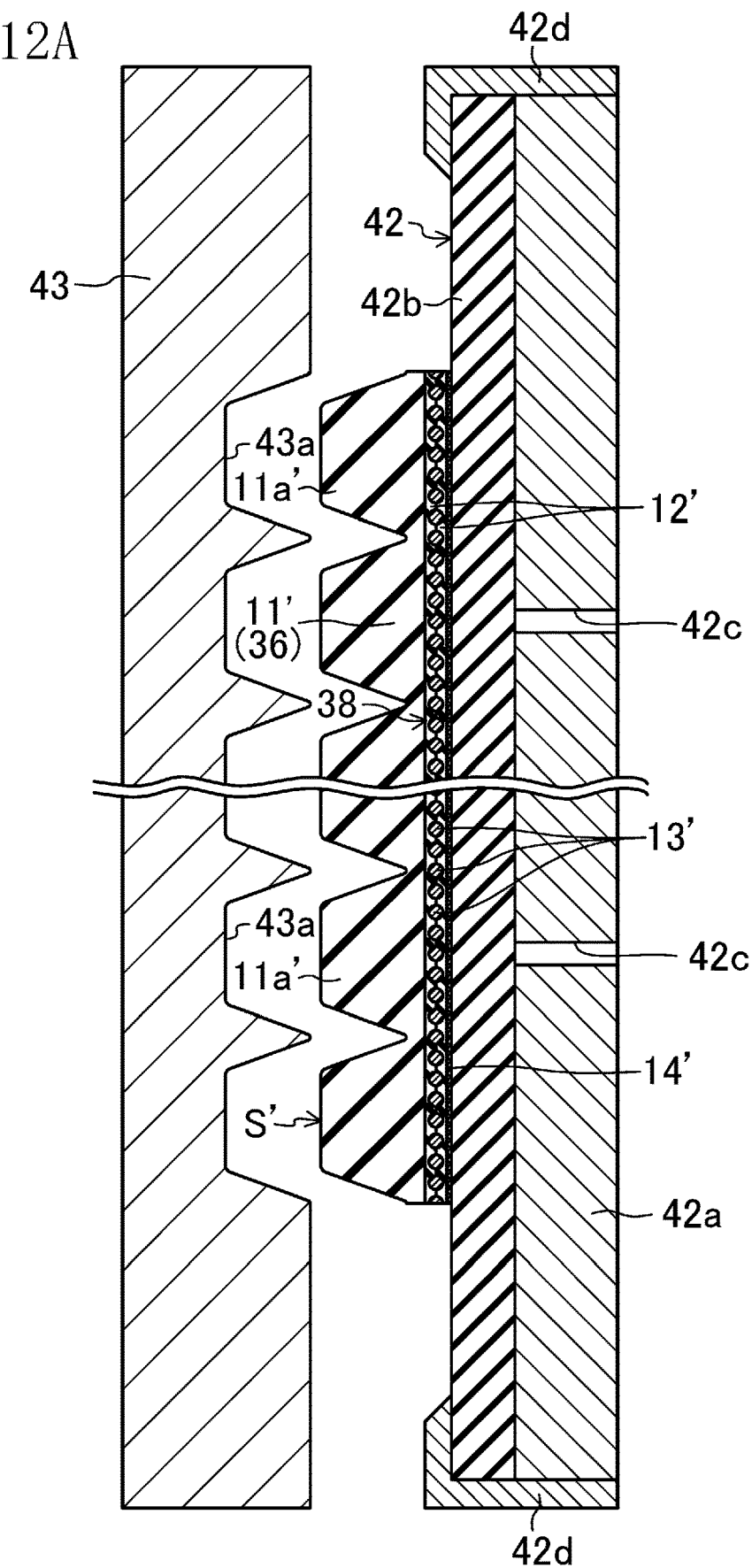
FIG. 12A is a first diagram for showing a crosslinking step of the production method 1-3 of the first embodiment.

In the crosslinking step, as shown FIG. 12A, the expansion drum 42 on which the uncrosslinked slab S' has been formed is detached from the shaping machine, and the expansion drum 42 is attached to the crosslinking apparatus 40 so as to stand on the base 41 of the crosslinking apparatus 40.

Next, the cylindrical mold 43 is attached to the base 41 such that the cylindrical mold 43 covers the expansion drum 42. The cylindrical mold 43 is chosen to correspond to the length of the raw edge V-belt B to be produced, and have an inner diameter larger than an outer diameter of the uncrosslinked slab S' formed on the expansion drum 42. The uncrosslinked slab S' is positioned such that the distal end of each of the compressed rubber layer-forming portions 11a' is positioned at an opening of an associated one of the compressed rubber layer-shape grooves 43a of the cylindrical mold 43. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, the tensile member 38 is provided on the expansion sleeve 42b, and the shaped structure 36 and the tensile member 38 are in contact with each other. Note that short fibers, resin powder, or the like may be attached to the inner peripheral surface of the cylindrical mold 43 and/or the outer peripheral surface of the uncrosslinked slab S' in advance.

Figure 12B:
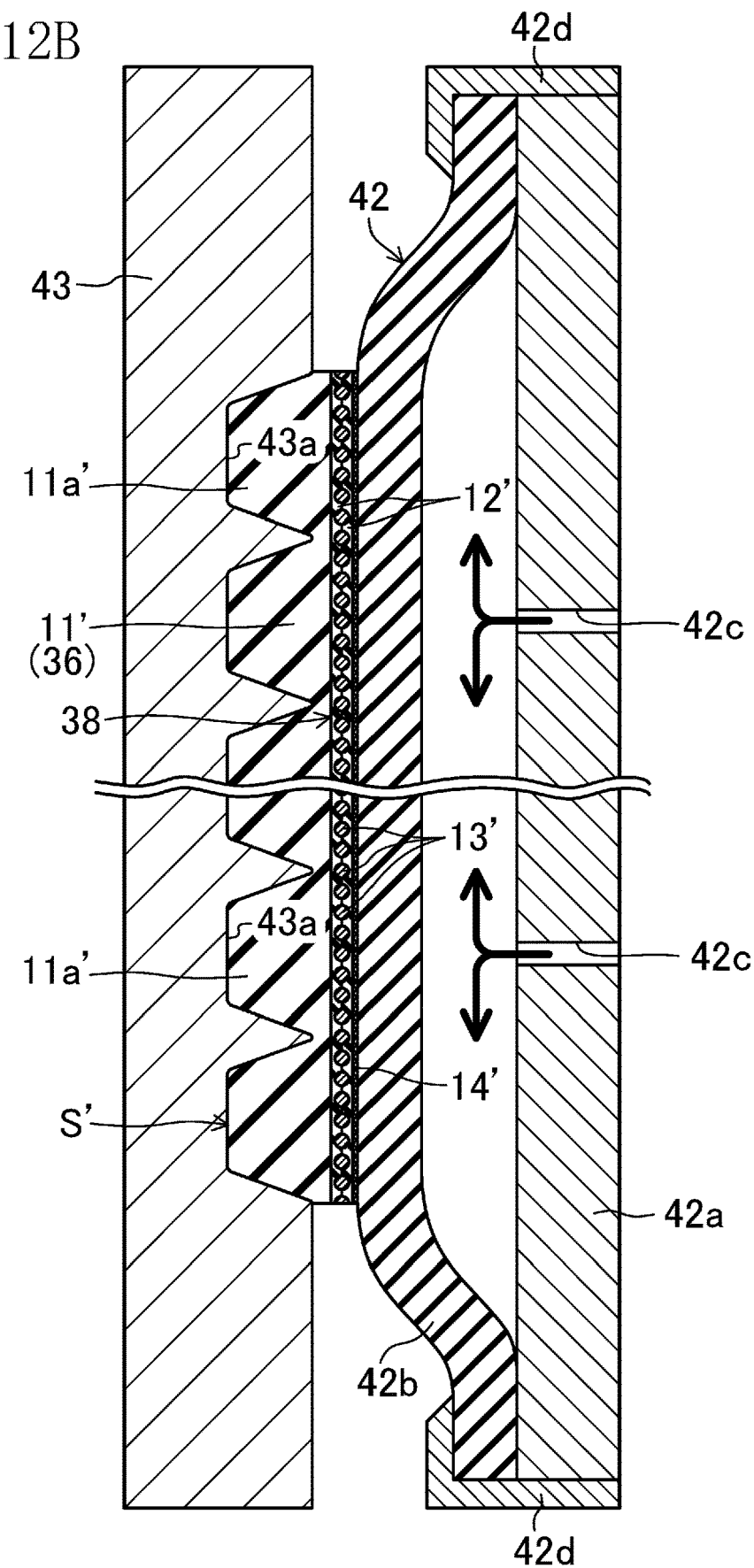
FIG. 12B is a second diagram for showing the crosslinking step of the production method 1-3 of the first embodiment.

As shown in FIG. 12B, the temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, the uncrosslinked slab S' is pushed by the expansion sleeve 42b and expands radially outward, causing each of the compressed rubber layer-forming portions 11a' to enter, and be fitted in, the associated one of the compressed rubber layer-shape grooves 43a of the cylindrical mold 43. In this state, the uncrosslinked slab S' is heated by the cylindrical mold 43 and pressed against the cylindrical mold 43 by the expansion sleeve 42b, thereby forming a belt slab S. That is, the pressing of the shaped structure 36 toward the cylindrical mold 43 is carried out by expanding the expansion sleeve 42b, located radially inward of the shaped structure 36, and pressing the shaped structure 36 from radially inside.

The other features and advantages are the same as those of the production method 1-1.

(Production Method 1-4)

A production method 1-4 will be described with reference to FIG. 13.

According to the production method 1-4, a cylindrical shaped structure 36 is produced in the shaping step, similarly to the production method 1-2. Similarly to the production method 1-3, a crosslinking apparatus 40 including an expansion drum 42 that is attachable to, and detachable from, a base 41 is used. The expansion drum 42 is rotatably supported on a shaft of a shaping machine (not shown) such that the axis of the expansion drum 42 extends horizontally. A cylindrical tensile member 38 is formed on the expansion drum 42, similarly to the production method 1-2.

Figure 13:
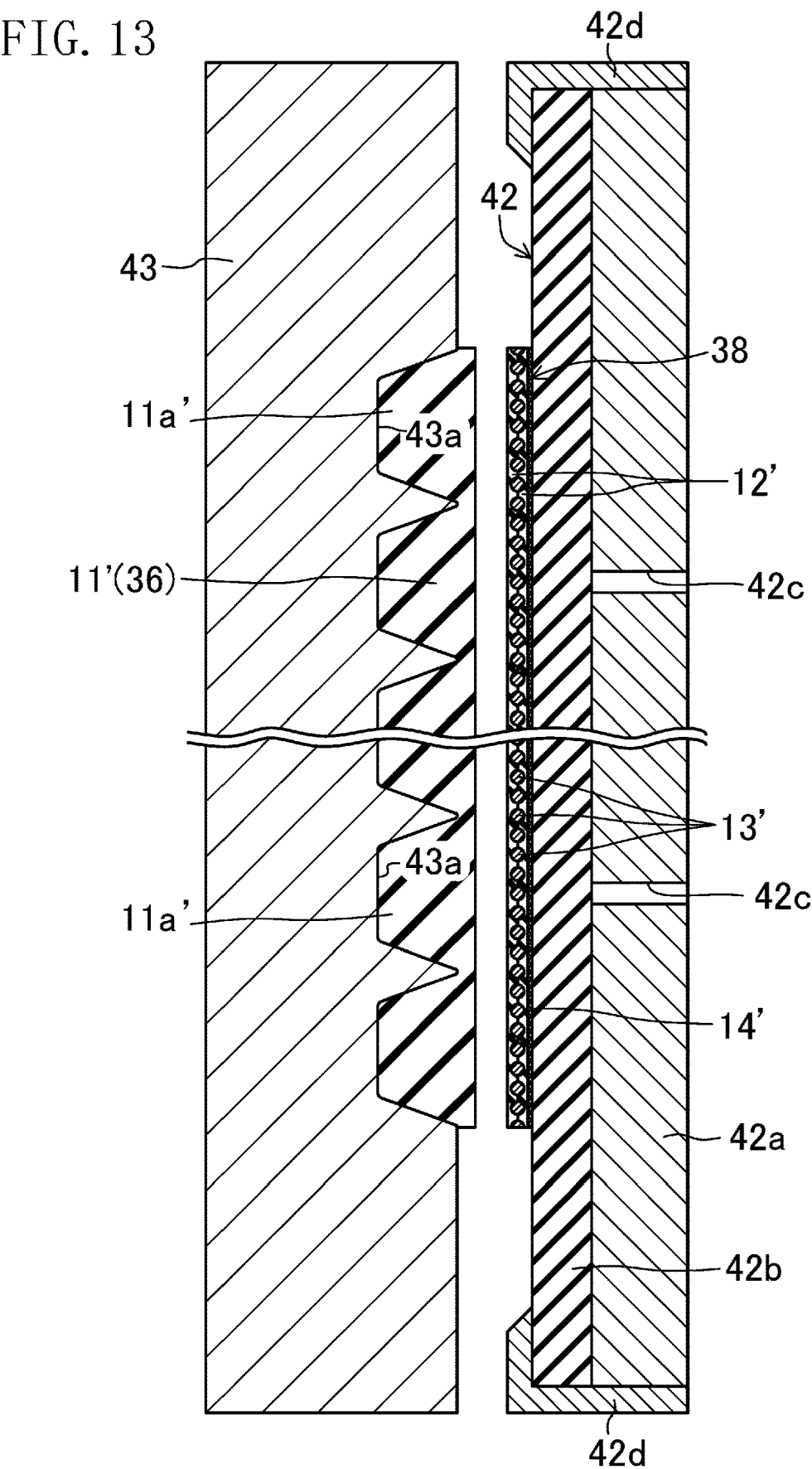
FIG. 13 is a diagram for showing a crosslinking step of a production method 1-4 of the first embodiment.

As shown in FIG. 13, similarly to the production method 1-2, the shaped structure 36 is placed inside the cylindrical mold 43 in the crosslinking step. More specifically, the shaped structure 36 is set inside the cylindrical mold 43 such that each of the plurality of compressed rubber layer-forming portions 11a' of the shaped structure 36 is fitted in an associated one of the compressed rubber layer-shape grooves 43a. Fitting the compressed rubber layer-forming portions 11a' in the compressed rubber layer-shape grooves 43a in advance, prior to heating the shaped structure 36 and pressing the shaped structure 36 toward the cylindrical mold 43 (as will be described later), reduces stretch of the rubber, thereby enabling production of a raw edge V-belt B having a stable structure. The cylindrical mold 43 is chosen to correspond to the length of the raw edge V-belt B to be produced. Note that short fibers, resin powder, or the like may be attached to the inner peripheral surface of the cylindrical mold 43 and/or the outer peripheral surface of the shaped structure 36 in advance.

The expansion drum 42 on which the tensile member 38 has been formed is detached from the shaping machine, and the expansion drum 42 is attached to the crosslinking apparatus 40 so as to stand on the base 41 of the crosslinking apparatus 40. Further, the cylindrical mold 43 within which the shaped structure 36 has been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the shaped structure 36 and the tensile member 38, and the tensile member 38 is formed on the expansion sleeve 42b.

The temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, the tensile member 38 is pushed by the expansion sleeve 42b, expands radially outward, and comes into contact with the shaped structure 36. While having each of the compressed rubber layer-forming portions 11a' of the shaped structure 36 fitted in the associated one of the compressed rubber layer-shape grooves 43a of the cylindrical mold 43, the shaped structure 36 and the tensile member 38 are heated by the cylindrical mold 43 and pressed against the cylindrical mold 43 by the expansion sleeve 42b. A belt slab S is formed as a result. That is, the pressing of the shaped structure 36 toward the cylindrical mold 43 is carried out by expanding the expansion sleeve 42b, located radially inward of the shaped structure 36, and pressing the shaped structure 36 from radially inside.

The other features and advantages are the same as those of the production method 1-1.

Second Embodiment

Figure 14:
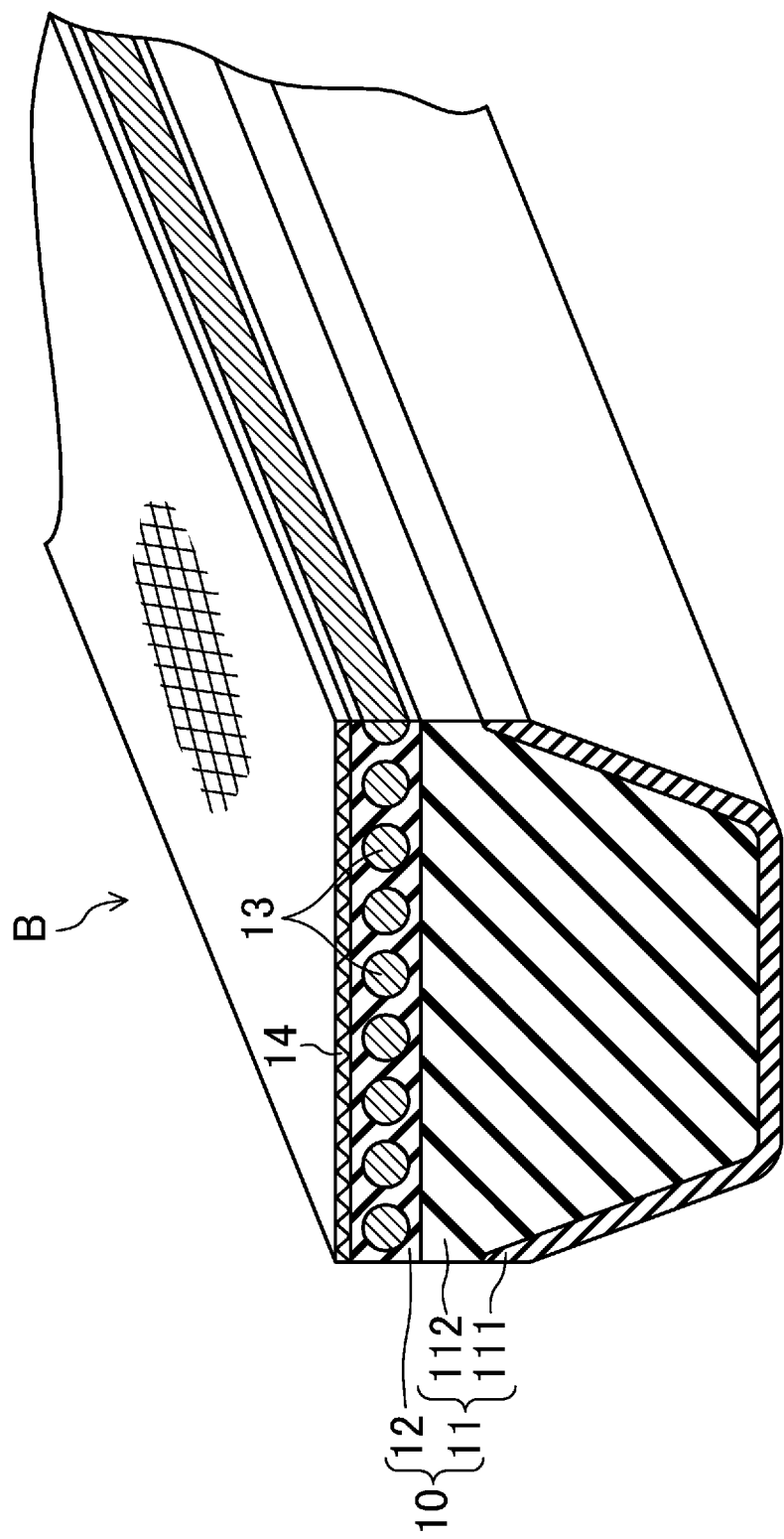
FIG. 14 is a perspective view of a raw edge V-belt produced by a production method according to a second embodiment.

FIG. 14 shows a raw edge V-belt B produced by a production method according to a second embodiment. Like reference characters have been used to designate the same elements as those in the first embodiment.

According to the second embodiment, the compressed layer 11 of the raw edge V-belt B has a surface rubber layer 111 constituting a surface portion of the compressed rubber layer 11 and a core rubber layer 112 constituting an inner portion of the compressed rubber layer 11.

The surface rubber layer 111 and the core rubber layer 112 are made of different crosslinked rubber compositions, each of which is produced by crosslinking, through heating and pressurization, an uncrosslinked rubber composition prepared by kneading a rubber component and various compound ingredients together.

Examples of the rubber component include ethylene-α-olefin elastomer (such as EPDM and EPR), chloroprene rubber (CR), chlorosulfonated polyethylene rubber (CSM), and hydrogenated acrylonitrile-butadiene rubber (H-NBR). One of these substances or a blend of two or more of these substances is suitably used as the rubber component. Examples of the compound ingredients include a reinforcing material (such as a carbon black), a filler, a plasticizer, a processing aid, a crosslinking agent, a co-crosslinking agent, a vulcanization accelerator, a vulcanization accelerator aid, and an antioxidant. Apart from the foregoing ingredients, examples of the compound ingredients which can be blended with the rubber composition forming the surface rubber layer 111 include surface texture modifiers such as short fibers, fluororesin powder, polyethylene resin powder, hollow particles, and a foaming agent.

The other configurations are the same as those of the raw edge V-belt B of the first embodiment shown in FIG. 1.

(Production Method 2-1)

A production method 2-1 for producing the raw edge V-belt B according to the second embodiment will be described with reference to FIGS. 15A and 15B to 17.

The production method 2-1 includes a component preparation step, a shaping step, a crosslinking step, and a finishing step. Among these steps, the finishing step is the same as the finishing step of the production method 1-1.

<Component Preparation Step>

In the component preparation step, a surface rubber sheet 111' to constitute the surface rubber layer 111, a core rubber sheet 112' to constitute the core rubber layer 112, an adhesive rubber sheet 12' to constitute the adhesive rubber layer 12, a cord 13', and a reinforcing fabric 14' are produced. Among these components, the adhesive rubber sheet 12', the cord 13', and the reinforcing fabric 14' are produced by the same techniques as those in the production method 1-1.

Surface Rubber Sheet 111'

A rubber component and compound ingredients are kneaded together by using a kneading machine such as kneader or a Banbury mixer to obtain an uncrosslinked rubber composition (a second uncrosslinked rubber composition). The uncrosslinked rubber composition is molded by calender molding or the like, into a sheet, i.e., the surface rubber sheet 111'. Short fibers or resin powder may be previously attached to a surface, of the surface rubber sheet 111', which is to constitute a surface of the belt.

Core Rubber Sheet 112'

A rubber component and compound ingredients are kneaded together by using a kneading machine such as a kneader or a Banbury mixer to obtain an uncrosslinked rubber composition (a first uncrosslinked rubber composition). The uncrosslinked rubber composition is formed into a thick uncrosslinked rubber sheet 112" by calender molding, etc. The core rubber sheet 112' is then prepared from the uncrosslinked rubber sheet 112".

The core rubber sheet 112' has, on one surface, a plurality of core rubber layer-forming portions 112a' which are linearly-extending ridges and which extend parallel to one another. The plurality of core rubber layer-forming portions 112a' have the same shape. Each core rubber layer-forming portion 112a' has a width decreasing toward its distal end. Specifically, each core rubber layer-forming portion 112a' is shaped to have a cross section in an isosceles trapezoidal shape.

Figure 15B:
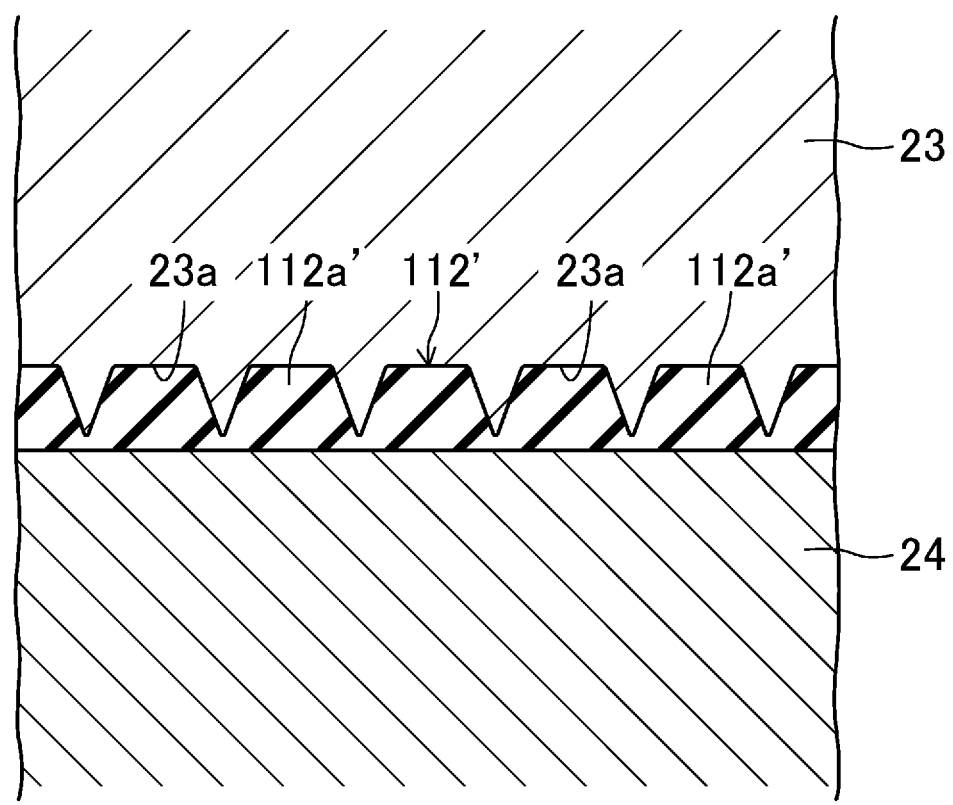
FIG. 15B is a cross-sectional view taken along line XVB-XVB of FIG. 15A.

The core rubber sheet 112' can be prepared in the following manner. As shown in FIGS. 15A and 15B, the uncrosslinked rubber sheet 112" is passed between a flat roll 24 and a core rubber-shaping roll 23 having trapezoidal grooves 23a that have a shape corresponding to the shape of the core rubber layer-forming portions 112a' of the core rubber sheet 112', extend in the circumferential direction, and are arranged adjacent to each other in the axial direction of the core rubber-shaping roll 23. In this manner, the trapezoidal grooves 23a on the outer peripheral surface of the core rubber-shaping roll 23 are pressed onto one of the surfaces of the uncrosslinked rubber sheet 112", thereby forming the core rubber layer-forming portions 112a'. The uncrosslinked rubber sheet 112" may be heated to increase the plasticity of the uncrosslinked rubber sheet 112". The core rubber sheet 112' can also be prepared by press molding or extrusion molding.

<Shaping Step>

In the shaping step, similarly to the steps of the production method 1-1 shown in FIGS. 4A to 4C, the reinforcing fabric 14', the adhesive rubber sheet 12', the cord 13', and the adhesive rubber sheet 12' are first stacked on the shaping mandrel 31 in the stated order. After that, the entire circumferential surface of the stacked structure is pressed with a roller 32 on the adhesive rubber sheet 12' to integrate the stacked structure and produce a cylindrical tensile member 38.

Figure 16A:
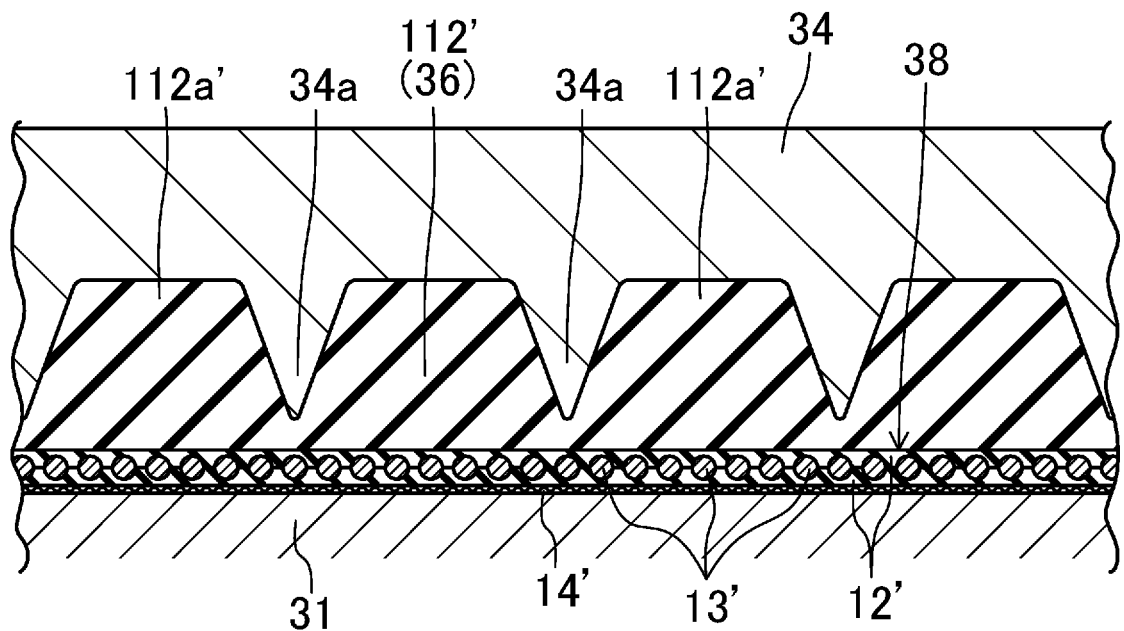
FIG. 16A is a first diagram for showing a shaping step of the production method 2-1 of the second embodiment.

Next, as shown in FIG. 16A, the core rubber sheet 112' is wrapped around the adhesive rubber sheet 12' of the tensile member 38 such that the core rubber layer-forming portions 112a' face outside and extend in the circumferential direction. At this time, a first comb-shaped guide 34 having a shape corresponding to the core rubber layer-forming portions 112a' of the core rubber sheet 112' is set outside the shaping mandrel 31 such that the first guide 34 extends in the axial direction and such that comb teeth 34a of the first guide 34 face the shaping mandrel 31. Each of the core rubber layer-forming portions 112a' of the core rubber sheet 112' is guided between an associated pair of the comb teeth 34a, so that the core rubber sheet 112' is wrapped around, and stacked on, the adhesive rubber sheet 12', with the core rubber layer-forming portions 112a' extending in the circumferential direction with high precision. The core rubber sheet 112' is cut with an ultrasound cutter or the like, and its ends are butt jointed. To increase the joint strength, the butt joint is suitably achieved by abutting surfaces, of the core rubber sheet 112', which are oblique with respect to the thickness direction of the core rubber sheet 112'. A core rubber sheet 112' having a predetermined length may be formed into a cylindrical shape with its both ends joined together such that the core rubber layer-forming portions 112a' face outside, and this cylindrical core rubber sheet 112' may be fitted over the adhesive rubber sheet 12'. The cylindrical core rubber sheet 112' constitutes a shaped structure 36 which has a cylindrical shape. The shaped structure 36 is made of the uncrosslinked rubber composition and has, on its outer peripheral surface, the core rubber layer-forming portions 112a' which are the plurality of ridges extending in the circumferential direction and which are arranged adjacent to each other in the axial direction.

Figure 16B:
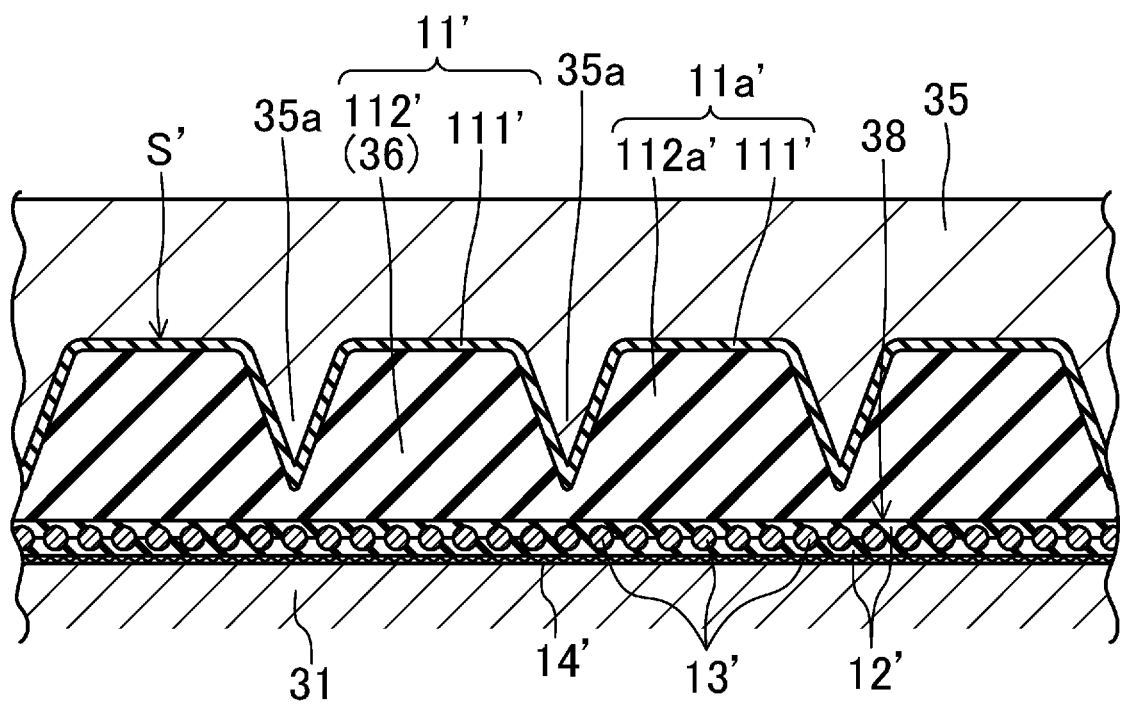
FIG. 16B is a second diagram for showing the shaping step of the production method 2-1 of the second embodiment.
Figure 16C:
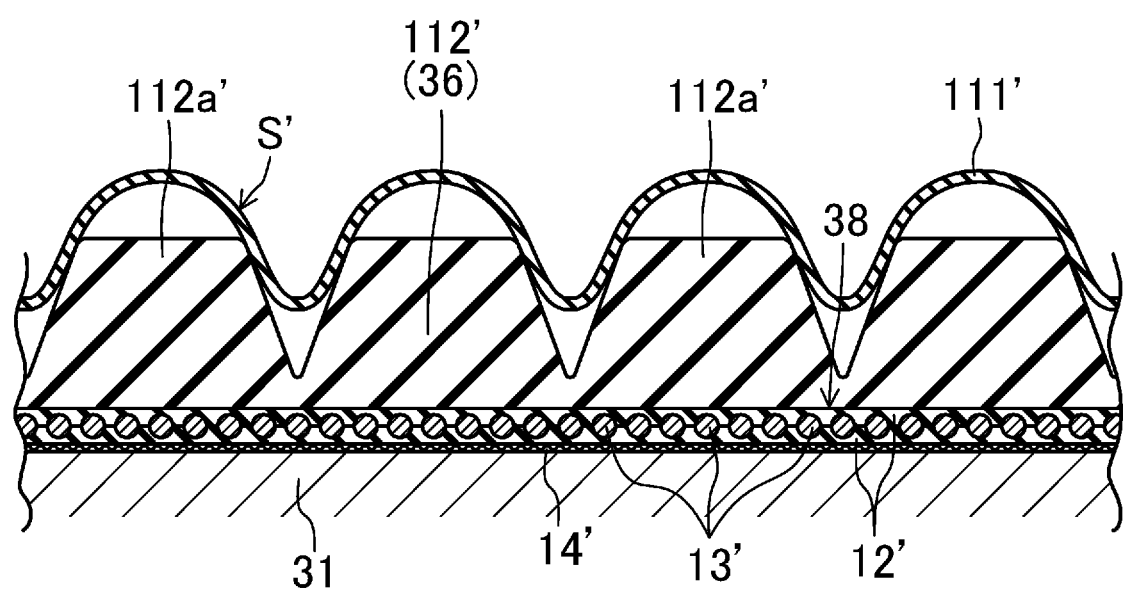
FIG. 16C is a third diagram for showing the shaping step of the production method 2-1 of the second embodiment.

Then, as shown in FIG. 16B, the surface rubber sheet 111' is wrapped around the core rubber sheet 112', thereby forming an uncrosslinked slab S'. At this moment, instead of the first guide 34, a second comb-shaped guide 35 having a shape which leaves a space corresponding to a thickness of the surface rubber layer 111 between itself and the core rubber sheet 112' is set such that the second guide 35 extends in the axial direction and such that comb teeth 35a of the second guide 35 face the shaping mandrel 31. Thus, the surface rubber sheet 111' is forced into the space between the core rubber sheet 112' and the second guide 35, and wraps around and covers the surface of the core rubber sheet 112' to be stacked on the core rubber sheet 112'.

Covering the surface of the core rubber sheet 112' with the surface rubber sheet 111' in advance in this manner, prior to heating the uncrosslinked slab S' including the shaped structure 36 and pressing this uncrosslinked slab S' toward the cylindrical mold 43 in the crosslinking step which will be described later, can reduce stretch of the surface rubber sheet 111' to a small amount, enabling production of the raw edge V-belt B including the surface rubber layer 111 having a uniform thickness. Similarly, in order to reduce the stretch of the surface rubber sheet 111' to a small amount and achieve a uniform thickness of the surface rubber layer 111, the surface rubber sheet 111' is suitably subjected to a pleating process so that the cross section in the width direction is pleated to have the same pitches as the core rubber layer-forming portions 112a', prior to covering the surface of the core rubber sheet 112' with the surface rubber sheet 111' using the second guide 35. The surface rubber sheet 111' is suitably positioned such that a portion of the surface rubber sheet 111' which protrudes toward the core rubber sheet 112' (the core rubber layer-forming portions 112a') is located at, and halfway fitted in, the groove between the core rubber layer-forming portions 112a of the core rubber sheet 112', so that the surface rubber sheet 111' may loosely fit the core rubber sheet 112'. Such a pleating process may include continuously passing the surface rubber sheet 111' between a pair of plate-like or roll members for pleating the surface rubber sheet 111' which originally has a flat shape. Suitably, the surface rubber sheet 111' is subjected to a pleating process so that pitches of the pleated shape gradually decrease in a length direction.

The surface rubber sheet 111' may be closely fitted to the core rubber sheet 112', or may simply lie along the surface of the core rubber sheet 112' instead of being closely fitted. Ends of the surface rubber sheet 111' is butt jointed, lap jointed, or jointed, on an underlying layer, with a space between the ends. Alternatively, the surface rubber sheet 111' may be layered on the core rubber sheet 112' in the following manner: ends of a surface rubber sheet 111' having a predetermined length are jointed together to form a cylindrical shape; the thus obtained cylindrical surface rubber sheet 111' is fitted over the core rubber sheet 112'; and the entire peripheral surface of the core rubber sheet 112' is covered with the cylindrical surface rubber sheet 111' using the second guide 35.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 112', and the surface rubber sheet 111' that are sequentially stacked toward the outside. The uncrosslinked slab S' includes the shaped structure 36 having a cylindrical shape. In the uncrosslinked slab S', the core rubber sheet 112' and the surface rubber sheet 111' covering the core rubber sheet 112' together form the compressed rubber sheet 11'. Further, the core rubber layer-forming portions 112a' and the surface rubber sheet 111' made of the uncrosslinked rubber composition and covering the core rubber layer-forming portions 112a' together form compressed rubber layer-forming portions 11a'.

<Crosslinking Step>

In the crosslinking step, a crosslinking apparatus 40 similar to the crosslinking apparatus used in the production method 1-1 is used.

The uncrosslinked slab S' is removed from the shaping mandrel 31, and then, placed inside the cylindrical mold 43 of the crosslinking apparatus 40, which has been previously detached from the base 41. More specifically, the uncrosslinked slab S' is set inside the cylindrical mold 43 such that each of the plurality of compressed rubber layer-forming portions 11a' of the uncrosslinked slab S' (the core rubber layer-forming portions 112a' covered with the surface rubber sheet 111') is fitted in an associated one of the compressed rubber layer-shape grooves 43a of the cylindrical mold 43. Fitting the compressed rubber layer-forming portions 11a' in the compressed rubber layer-shape grooves 43a in advance, prior to heating the uncrosslinked slab S' including the shaped structure 36 and pressing this uncrosslinked slab S' toward the cylindrical mold 43 (as will be described later), reduces stretch of the rubber, thereby enabling production of a raw edge V-belt B having a stable structure. At this moment, the shaped structure 36 and the surface rubber sheet 111' are set inside the cylindrical mold 43 such that the shaped structure 36 is positioned inside, and the surface rubber sheet 111' is positioned outside, with respect to each other. The cylindrical mold 43 is chosen to correspond to the length of the raw edge V-belt B to be produced. Note that short fibers, resin powder, or the like may be attached to the inner peripheral surface of the cylindrical mold 43 and/or the outer peripheral surface of the uncrosslinked slab S' in advance.

Subsequently, as shown FIG. 17, the cylindrical mold 43 within which the uncrosslinked slab S' has been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

The temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, while having each of the compressed rubber layer-forming portions 11a' fitted in the associated one of the compressed rubber layer-shape grooves 43a of the cylindrical mold 43, the uncrosslinked slab S' is heated by the cylindrical mold 43 and pressed against the cylindrical mold 43 by the expansion sleeve 42b. That is, the pressing of the shaped structure 36 toward the cylindrical mold 43 is carried out by expanding the expansion sleeve 42b, located radially inward of the shaped structure 36, and pressing the shaped structure 36 from radially inside. Further, the rubber components contained in the surface rubber sheet 111', the core rubber sheet 112', and the adhesive rubber sheet 12' that are included in the uncrosslinked slab S' are crosslinked to be integrated with one another. As a result, a continuous member of belt bodies 10 for a plurality of raw edge V-belts B, each including the compression layer 11 comprised of the surface rubber layer 111 and the core rubber layer 112 and including the adhesive rubber layer 12, is produced. At the same time, the rubber components adhere to, and is combined with, the cord 13' and the reinforcing fabric 14'. A cylindrical belt slab S is thus formed eventually.

The other features and advantages are the same as those of the production method 1-1.

The production method 2-1 is applicable to the production method 1-3, in which a crosslinking apparatus 40 including an expansion drum 42 that is attachable to, and detachable from, a base 41 similarly to the expansion drum 42 of the production method 1-3 is used. The expansion drum 42 may serve as a shaping mandrel 31 to produce the raw edge V-belt B of the second embodiment.

(Production Method 2-2)

A production method 2-2 will be described with reference to FIG. 18.

According to the production method 2-2, the core rubber sheet 112' is cut, in the shaping step, so as to have a length which corresponds to the length of the raw edge V-belt B to be produced. Ends of the core rubber sheet 112' are cut with an ultrasound cutter or the like, and are butt jointed with an ultrasound welder or the like such that the core rubber layer-forming portions 112a' face outside and extend in the circumferential direction. To increase the joint strength, the butt joint is suitably achieved by abutting surfaces, of the core rubber sheet 112', which are oblique with respect to the thickness direction of the core rubber sheet 112'. A shaped structure 36 which has a cylindrical shape is produced in this manner. The shaped structure 36 is made of the uncrosslinked rubber composition and has, on its outer peripheral surface, the plurality of core rubber layer-forming portions 112a' extending in the circumferential direction and arranged adjacent to each other in the axial direction.

Next, the surface rubber sheet 111' is wrapped around the shaped structure 36 such that the surface rubber sheet 111' covers, and is stacked on, the surface of the shaped structure 36. At this moment, each of the plurality of the core rubber layer-forming portions 112a' is covered with the surface rubber sheet 111'. The core rubber layer-forming portions 112a' covered with the surface rubber sheet 111' constitute the compressed rubber layer-forming portions 11a'. Covering the surface of the core rubber sheet 112' with the surface rubber sheet 111' in advance reduces stretch of the surface rubber sheet 111', enabling production of the raw edge V-belt B including a surface rubber layer 111 having a uniform thickness. The surface rubber sheet 111' may be closely fitted to the core rubber sheet 112' (the core rubber layer-forming portions 112a') like a single sheet, or may simply lie along the surface of the core rubber sheet 112' instead of being closely fitted. Ends of the surface rubber sheet 111' is butt jointed, lap jointed, or jointed, on an underlying layer, with a space between the ends. Alternatively, a surface rubber sheet 111' having a predetermined length may be formed into a cylindrical shape through joining of its both ends, and this cylindrical surface rubber sheet 111' may be fitted over the shaped structure 36 so as to cover the entire peripheral surface of the shaped structure 36.

Further, similarly to the steps of the production method 1-1 shown in FIGS. 4A to 4C, the reinforcing fabric 14', the adhesive rubber sheet 12', the cord 13', and another adhesive rubber sheet 12' are stacked on the shaping mandrel 31 in the stated order. After that, the entire circumferential surface of the stacked structure is pressed with a roller 32 on the adhesive rubber sheet 12' to integrate the stacked structure and produce a cylindrical tensile member 38.

Figure 18:
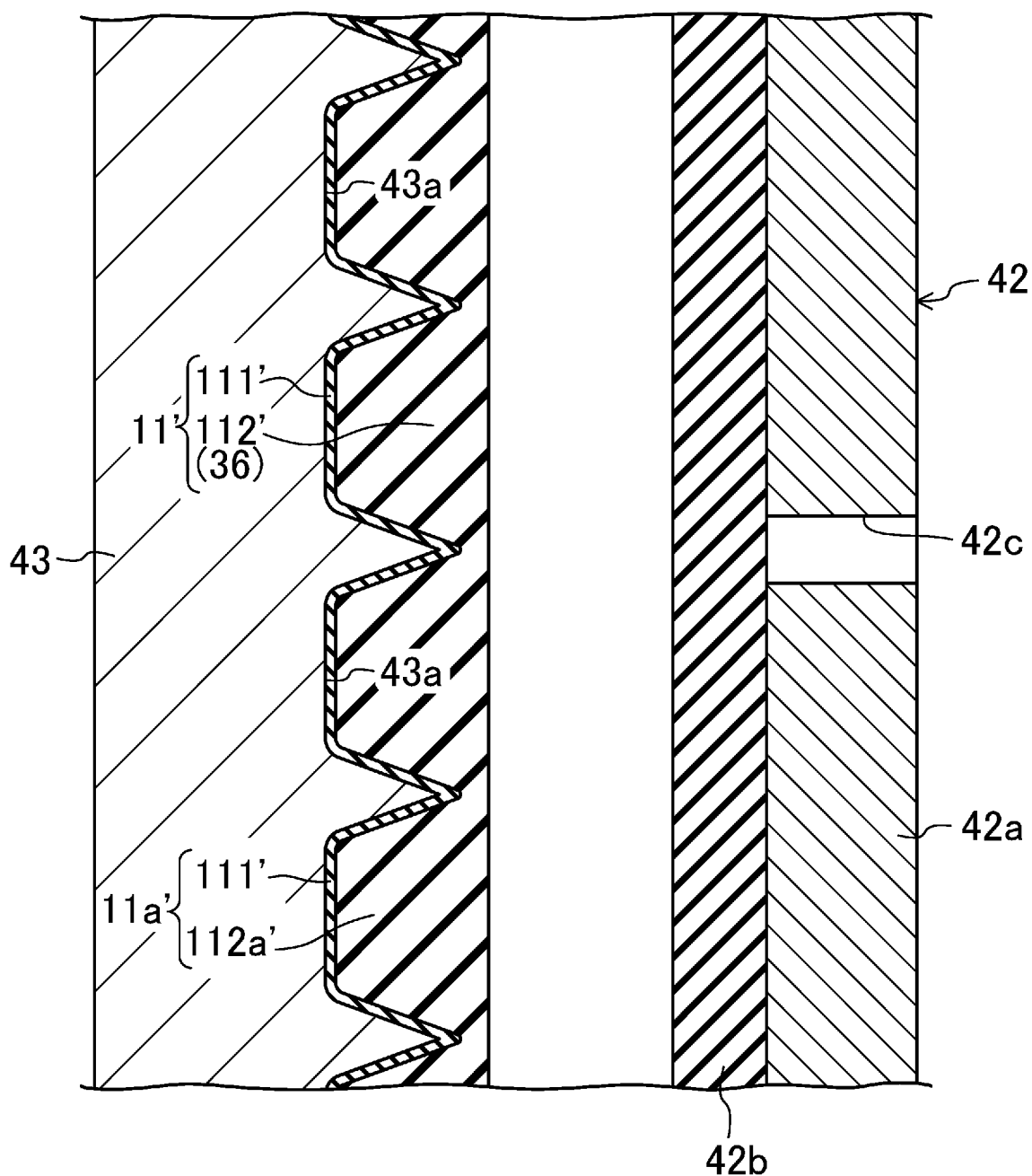
FIG. 18 is a diagram for showing a crosslinking step of a production method 2-2 of the second embodiment.

As shown in FIG. 18, the shaped structure 36 covered with the surface rubber sheet 111' is placed inside the cylindrical mold 43 in the crosslinking step. More specifically, the shaped structure 36 covered with the surface rubber sheet 111' is set inside the cylindrical mold 43 such that each of the plurality of compressed rubber layer-forming portions 11a' comprised of the core rubber layer-forming portions 112a' covered with the surface rubber sheet 111' is fitted in an associated one of the compressed rubber layer-shape grooves 43a of the cylindrical mold 43. Fitting the compressed rubber layer-forming portions 11a' in the compressed rubber layer-shape grooves 43a in advance, prior to heating the shaped structure 36 and pressing the shaped structure 36 toward the cylindrical mold 43 in the crosslinking step (as will be described later), reduces stretch of the rubber, thereby enabling production of a raw edge V-belt B having a stable structure. At this moment, the shaped structure 36 and the surface rubber sheet 111' are set inside the cylindrical mold 43 such that the shaped structure 36 is positioned inside, and the surface rubber sheet 111' is positioned outside, with respect to each other. The cylindrical mold 43 is chosen to correspond to the length of the raw edge V-belt B to be produced. Note that short fibers, resin powder, or the like may be attached in advance to the inner peripheral surface of the cylindrical mold 43 and/or the outer peripheral surface of the surface rubber sheet 111' covering the shaped structure 36.

Figure 17:
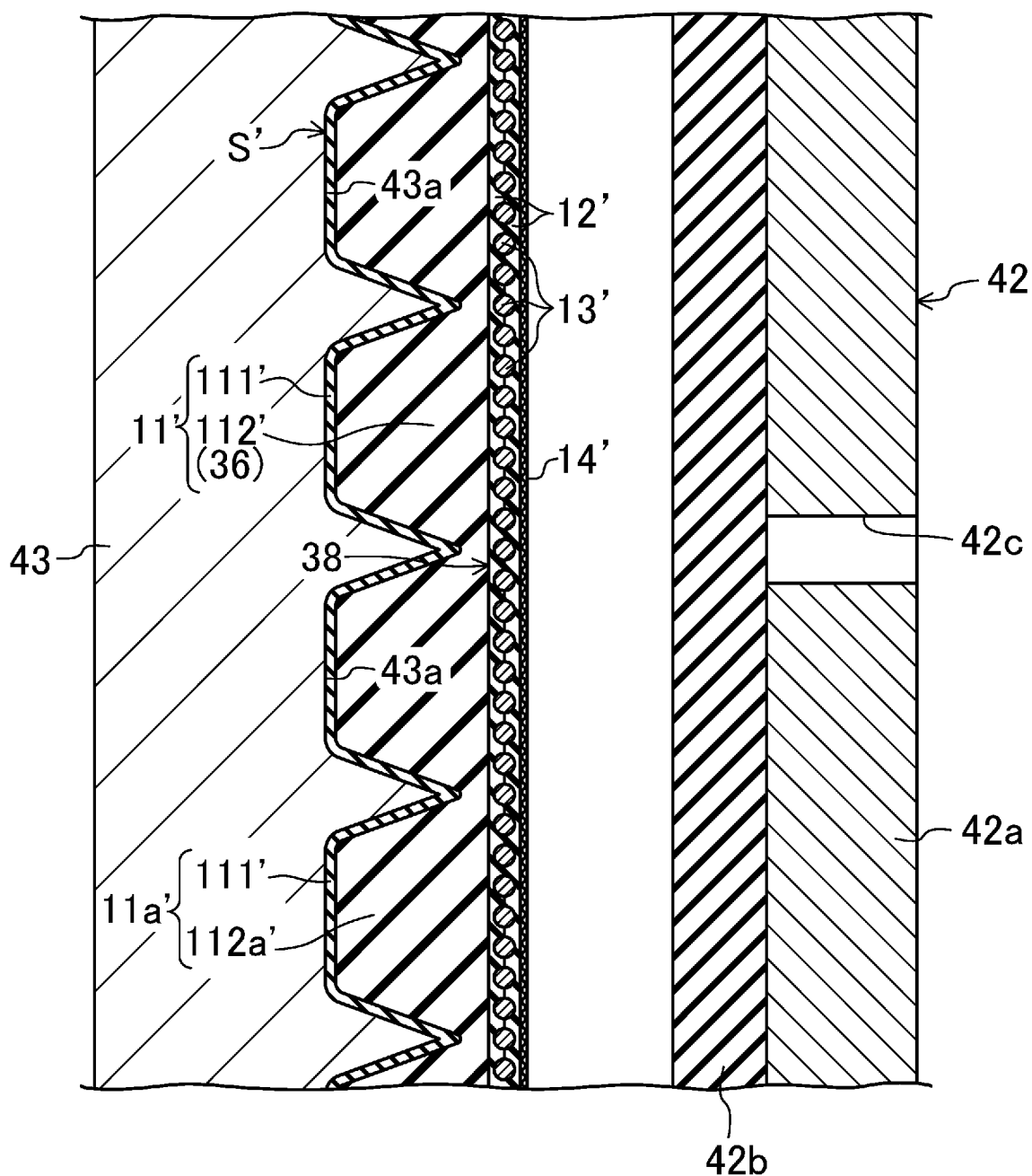
FIG. 17 is a diagram for showing a crosslinking step of the production method 2-1 of the second embodiment.

The tensile member 38 is removed from the shaping mandrel 31, and is then fitted to the shaped structure 36 set in the cylindrical mold 43 such that the outer peripheral surface of the tensile member 38 comes into contact with the inner peripheral surface of the shaped structure 36, that is, so as to be in a similar positional relationship shown in FIG. 17 illustrating the production method 2-1.

Then, the cylindrical mold 43 within which the shaped structure 36 covered with the surface rubber sheet 111' and the tensile member 38 have been set is attached to the base 41 such that the cylindrical mold 43 covers the expansion drum 42. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42*b*, and the shaped structure 36 and the tensile member 38 are in contact with each other.

Note that the shaped structure 36 covered with the surface rubber sheet 111' may be fitted over the tensile member 38 to produce the uncrosslinked slab S'. This uncrosslinked slab S' may be placed inside the cylindrical mold 43.

Alternatively, the shaped structure 36 covered with the surface rubber sheet 111' may be placed inside the cylindrical mold 43, and the tensile member 38 may be placed outside the expansion drum 42. In this case, a gap is formed between the shaped structure 36 covered with the surface rubber sheet 111' and set in the cylindrical mold 43, and the tensile member 38 set on the expansion drum 42. When the expansion sleeve 42*b* of the expansion drum 42 is expanded radially outward, the tensile member 38 expands radially outward and comes into contact with the shaped structure 36 covered with the surface rubber sheet 111'. The shaped structure 36 covered with the surface rubber sheet 111' and the tensile member 38 in this state are heated by the cylindrical mold 43, and are pressed toward the cylindrical mold 43 by the expansion sleeve 42*b*. A belt slab S is formed as a result. That is, the pressing of the shaped structure 36 toward the cylindrical mold 43 is carried out by expanding the expansion sleeve 42*b*, located radially inward of the shaped structure 36, and pressing the shaped structure 36 from radially inside.

The other features and advantages are the same as those of the production method 2-1.

The production method 2-2 is applicable to the production method 1-4, in which a crosslinking apparatus 40 including an expansion drum 42 that is attachable to, and detachable from, a base 41 similarly to the expansion drum 42 of the production method 1-4 is used. The expansion drum 42 may serve as a shaping mandrel 31 to produce the raw edge V-belt B of the second embodiment.

(Production Method 2-3)

Figure 19A:
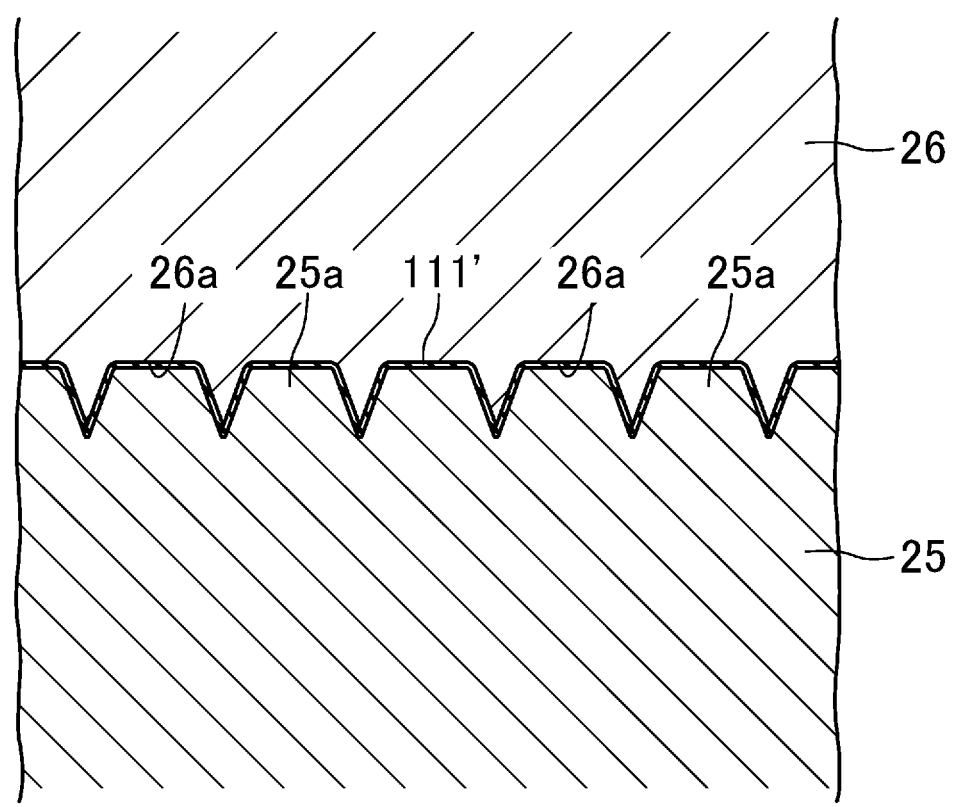
FIG. 19A is a first diagram for showing how to prepare a compressed rubber sheet in a component preparation step in a production method 2-3 of the second embodiment.
Figure 19B:
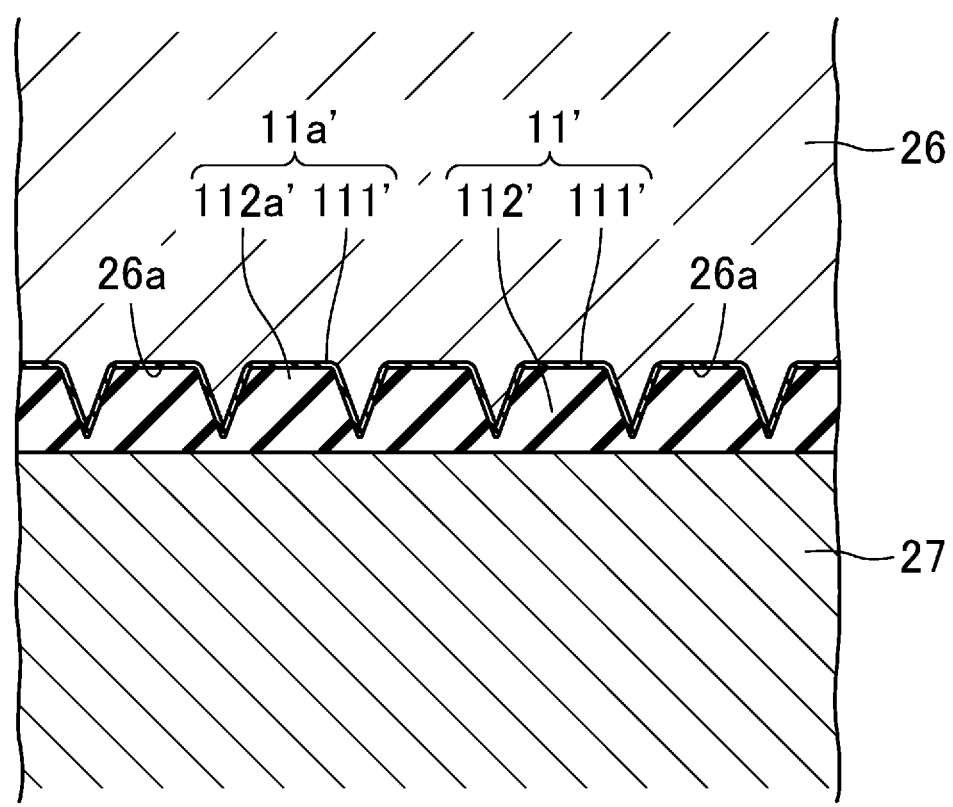
FIG. 19B is a second diagram for showing how to prepare the compressed rubber sheet in the component preparation step in the production method 2-3 of the second embodiment.
Figure 19C:
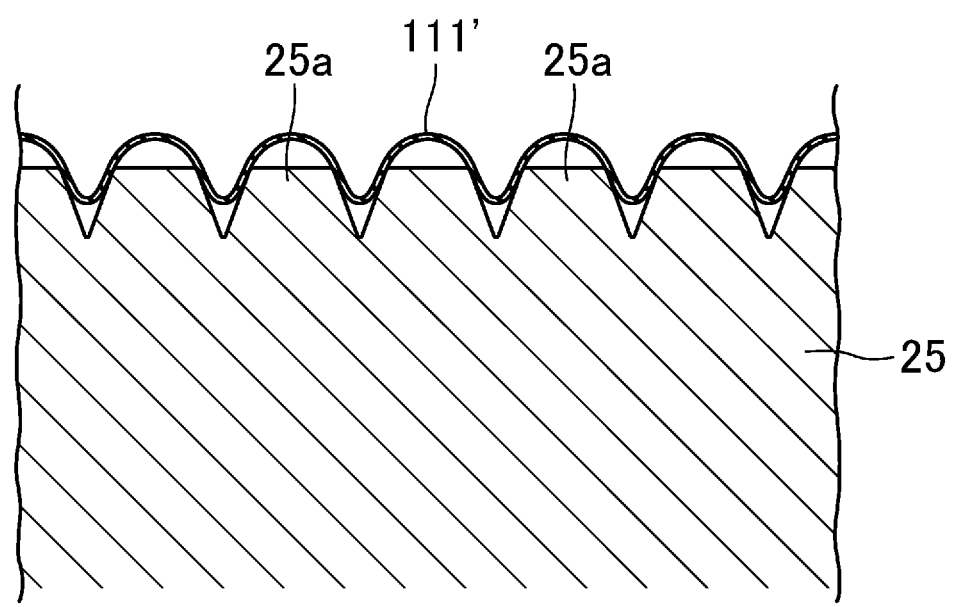
FIG. 19C is a third diagram for showing how to prepare the compressed rubber sheet in the component preparation step in the production method 2-3 of the second embodiment.

A production method 2-3 will be described with reference to FIGS. 19A to 19C.

According to the production method 2-3, the core rubber sheet 112' is covered with the surface rubber sheet 111' in advance in the shaping step, thereby forming a compressed rubber sheet 11' comprised of the core rubber sheet 112' covered with the surface rubber sheet 111', while forming compression layer-forming portions 11*a*' comprised of the core rubber layer-forming portions 112*a*' covered with the surface rubber sheet 111'. Covering the surface of the core rubber sheet 112' with the surface rubber sheet 111' in advance in this manner, prior to heating, and pressing toward the cylindrical mold 43, the shaped structure 36 or the uncrosslinked slab S' including the shaped structure 36 in the crosslinking step, can reduce stretch of the surface rubber sheet 111', enabling production of the raw edge V-belt B including the surface rubber layer 111 having a uniform thickness. The surface rubber sheet 111' may be closely fitted to the core rubber sheet 112', or may simply lie along the surface of the core rubber sheet 112' instead of being closely fitted.

The core rubber sheet 112' can be covered with the surface rubber sheet 111' in the following manner. That is, as shown in FIG. 19A, a surface rubber-shaping roll 25 having trapezoidal ridges 25*a* (which have a shape corresponding to the shape of the core rubber layer-forming portions 112*a*', extend in the circumferential direction, and are arranged adjacent to each other in the axial direction of the roll 25) and a transfer roll 26 having trapezoidal grooves 26*a* (which have a shape corresponding to the shape of the compressed rubber layer-forming portions 11*a*', extend in the circumferential direction, and are arranged adjacent to each other in the axial direction of the roll 26) are engaged with each other, with a space interposed therebetween. The surface rubber sheet 111' is passed between these two rolls so as to be shaped by the surface rubber-shaping roll 25, and fitted to the surface of the transfer roll 26. Then, as shown in FIG. 19B, the core rubber sheet 112' is passed between the transfer roll 26 and a flat roll 27 such that the core rubber layer-forming portions 112*a* are fitted in the trapezoidal grooves 26*a* of the transfer roll 26, thereby affixing the surface rubber sheet 111' to a surface of the core rubber sheet 112'. In order to improve productivity, as shown in FIGS. 15A and 15B, the core rubber-shaping roll 23 shapes the uncrosslinked rubber sheet 112" into the core rubber sheet 112', and as shown in FIG. 19A, the surface rubber-shaping roll 25 and the transfer roll 26 make the surface rubber sheet 111' fitted to the transfer roll 26. Then, as shown in FIG. 19B, the surface rubber sheet 111' on the transfer roll 26 is bonded to the core rubber sheet 112'. It is preferable that in this manner, the compressed rubber sheet 11' is continuously produced from the uncrosslinked rubber sheet 112" and the surface rubber sheet 111'.

Covering the surface of the core rubber sheet 112' with the surface rubber sheet 111' in advance prior to heating, and pressing toward the cylindrical mold 43, the shaped structure 36 or the uncrosslinked slab S' including the shaped structure 36, and further shaping, prior to this covering process, the surface rubber sheet 111' to a shape that fits the surface of the core rubber layer-forming portions 111*a*', make it possible to reduce stretch of the surface rubber sheet 111' to a small amount, enabling production of the raw edge V-belt B including the surface rubber layer 111 having a uniform thickness. Similarly, in order to reduce stretch of the surface rubber sheet 111', the surface rubber sheet 111' is suitably subjected to a pleating process so that the cross section in the width direction is pleated to have the same pitches as the core rubber layer-forming portions 112*a*' prior to sending the surface rubber sheet 111', not yet covering the surface of the core rubber sheet 112' (the core rubber layer-forming portions 112*a*'), to the surface rubber-shaping roll 25, similarly to the production method 2-1. As illustrated in FIG. 19C, the surface rubber sheet 111' is suitably positioned such that a portion of the surface rubber sheet 111' which protrudes toward the core rubber sheet 112' (the core rubber layer-forming portions 112*a*') is located at, and halfway fitted in, the groove between trapezoidal ridges 25*a* of the surface rubber-shaping roll 25*a*, that is, the groove between the core rubber layer-forming portions 112*a* of the core rubber sheet 112', so that the surface rubber sheet 111' may loosely fit the core rubber sheet 112'.

The core rubber sheet 112' can be covered with the surface rubber sheet 111' by pressing.

In the production method 2-1, the resultant core rubber sheet 112' covered with the surface rubber sheet 111' may be wrapped around the adhesive rubber sheet 12' to prepare an uncrosslinked slab S'. In the production method 2-2, the resultant core rubber sheet 112' covered with the surface rubber sheet 111' may be used for producing the shaped structure 36 covered with the surface rubber sheet 111'.

The other features and advantages are the same as those of the production method 2-1 or 2-2.

(Production Method 2-4)

A production method 2-4 will be described with reference to FIGS. 20A and 20B and FIGS. 21A and 21B.

According to the production method 2-4, similarly to the production method 2-1 (see the steps of the production method 1-1 shown in FIGS. 4A to 4C), in the shaping step, the reinforcing fabric 14', the adhesive rubber sheet 12', the cord 13', and another adhesive rubber sheet 12' are stacked on the shaping mandrel 31 in the stated order. After that, the entire circumferential surface of the stacked structure is pressed with a roller 32 on the adhesive rubber sheet 12' to integrate the stacked structure, around which the core rubber sheet 112' is wrapped.

Figure 20A:
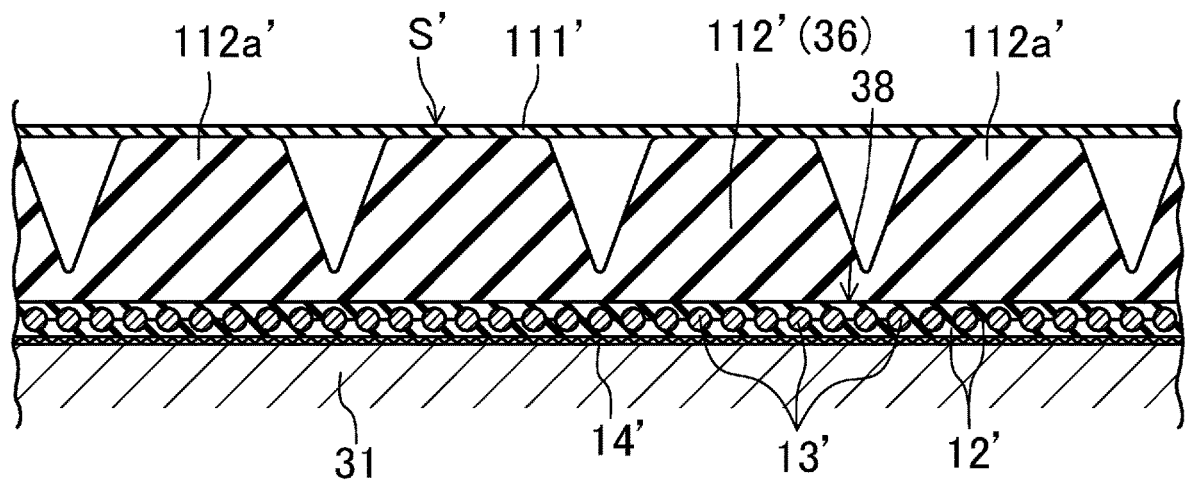
FIG. 20A is a diagram for showing a shaping step of a production method 2-4 of the second embodiment.
Figure 20B:
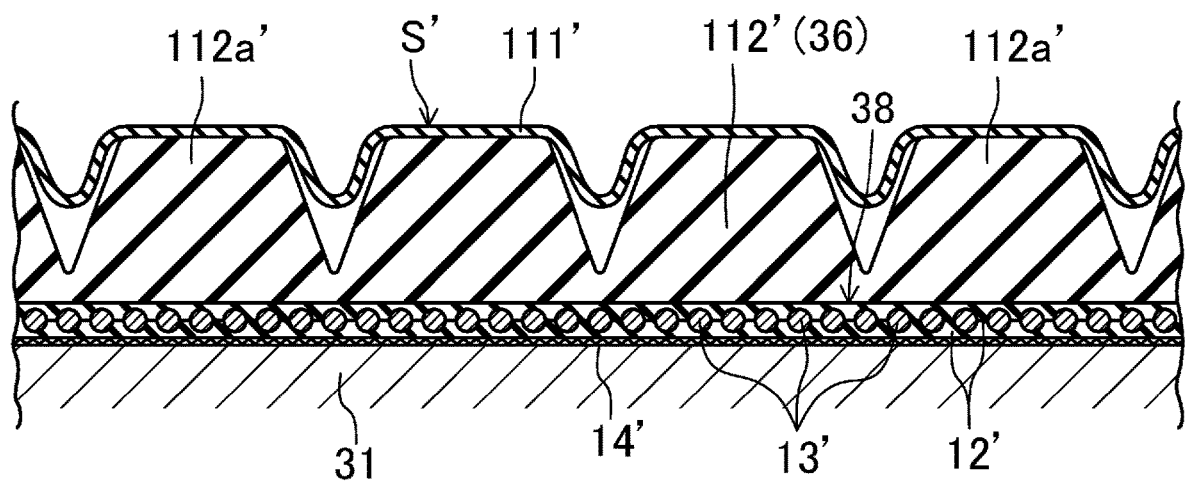
FIG. 20B is a diagram for showing a shaping step of a variation of the production method 2-4 of the second embodiment.

Then, as shown in FIG. 20A, the surface rubber sheet 111' is wrapped around the core rubber sheet 112'. At this moment, the surface rubber sheet 111' is wrapped, while forming a cylindrical shape, with the tops of the core rubber layer-forming portions 112a' of the core rubber sheet 112' supporting the surface rubber sheet 111'. The surface rubber sheet 111' is thus stacked on the core rubber sheet 112'. Ends of the surface rubber sheet 111' is butt jointed, lap jointed, or jointed, on an underlying layer, with a space between the ends. In order to reduce stretch of the surface rubber sheet 111' and make the surface rubber layer 111 have a uniform thickness, as shown in FIG. 20B, a portion of the surface rubber sheet 111' which corresponds to a groove between adjacent core rubber layer-forming portions 112a' of the core rubber sheet 112' may be halfway fitted in the groove between the adjacent core rubber layer-forming portions 112a' of the core rubber sheet 112'. For the same purpose, similarly to the steps of the production method 2-1 shown in FIG. 16C, the surface rubber sheet 111' is subjected to a pleating process so that the cross section in the width direction is pleated to have the same pitches as the core rubber layer-forming portions 112a'. The surface rubber sheet 111' may be positioned such that a portion of the surface rubber sheet 111' which protrudes toward the core rubber sheet 112' is halfway fitted in a groove between the core rubber layer-forming portions 112a of the core rubber sheet 112', so that the surface rubber sheet 111' may loosely fit the core rubber sheet 112'. A surface rubber sheet 111' having a predetermined length may be formed into a cylindrical shape with its both ends joined together, and this surface rubber sheet 111' may be fitted over the core rubber sheet 112'. In this case, fitting the cylindrical surface rubber sheet 111' over the core rubber sheet 112' takes place on the shaping mandrel 31. Alternatively, the cylindrical surface rubber sheet 111' is fitted over the core rubber sheet 112' after the cylindrical object including the core rubber sheet 112' is removed from the shaping mandrel 31.

In the manner described above, an uncrosslinked slab S' having a cylindrical shape is formed on the shaping mandrel 31. Thus, the uncrosslinked slab S' includes the reinforcing fabric 14', the adhesive rubber sheet 12', the cord 13', the other adhesive rubber sheet 12', the core rubber sheet 112', and the surface rubber sheet 111' that are sequentially stacked toward the outside. The uncrosslinked slab S' includes the core rubber sheet 112' formed into a cylindrical shape, i.e., a shaped structure 36 which has a cylindrical shape. The shaped structure 36 is made of the uncrosslinked rubber composition and has, on its outer peripheral surface, the core rubber layer-forming portions 112a' that are the plurality of ridges extending in the circumferential direction and that are arranged adjacent to each other in the axial direction.

Figure 21A:
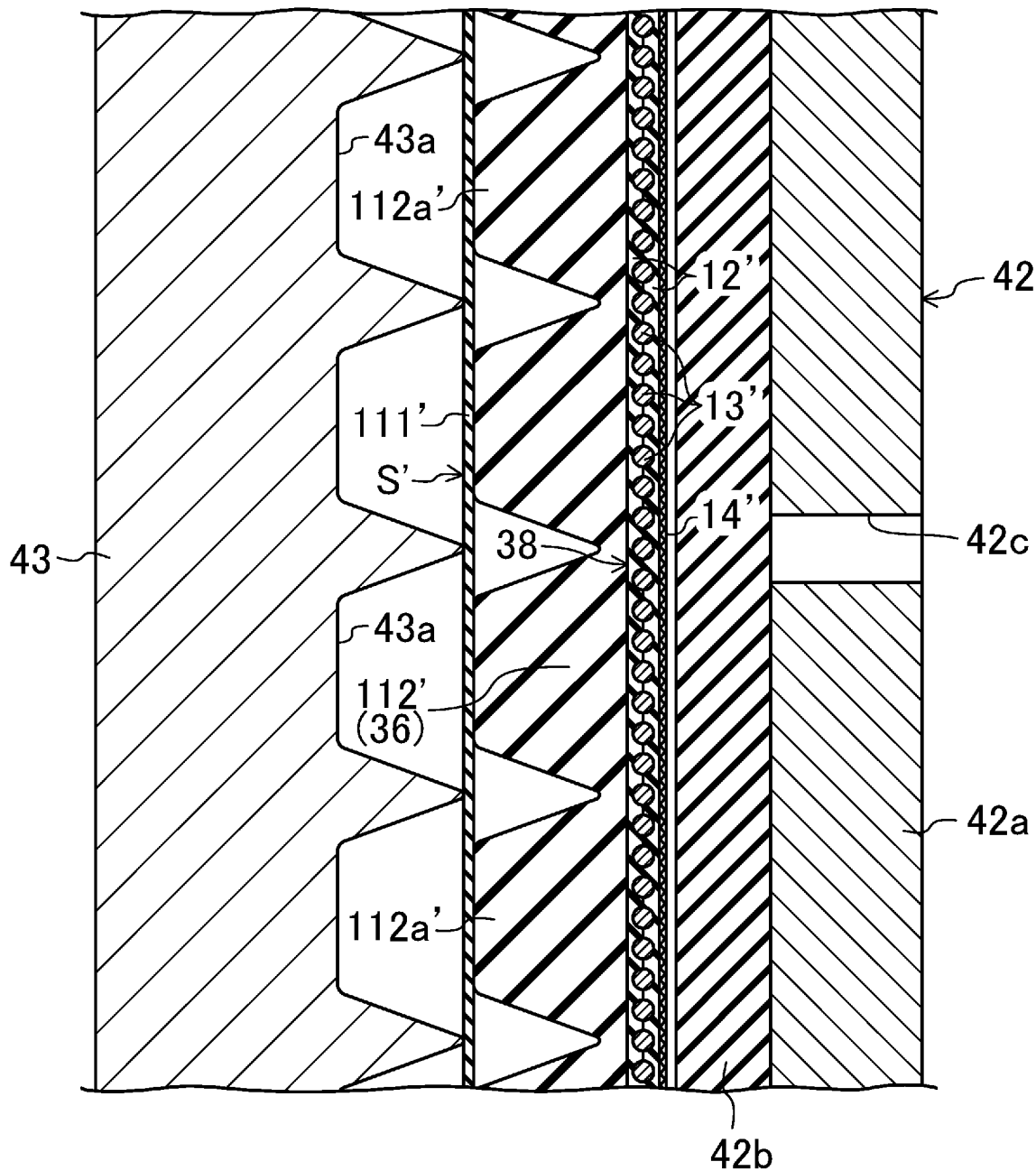
FIG. 21A is a first diagram for showing a crosslinking step of the production method 2-4 of the second embodiment.

As shown in FIG. 21A, in the crosslinking step, the uncrosslinked slab S' is removed from the shaping mandrel 31, and then, placed inside the cylindrical mold 43 of the crosslinking apparatus 40, which has been previously detached from the base 41. More specifically, the uncrosslinked slab S' is set inside the cylindrical mold 43 such that the outer periphery of the surface rubber sheet 111' comes into contact with the cylindrical mold 43 at locations apart from each other, and that each of the plurality of core rubber layer-forming portions 112a' of the core rubber sheet 112' is located at the opening of an associated one of the core rubber layer-shape grooves 43a of the cylindrical mold 43. The shaped structure 36 and the surface rubber sheet 111' are set inside the cylindrical mold 43 such that the shaped structure 36 is positioned inside, and the surface rubber sheet 111' is positioned outside, with respect to each other. The core rubber layer-forming portions 112a' may push the surface rubber sheet 111' such that part of the core rubber layer-forming portion 112a' enters the associated one of the core rubber layer-shape grooves 43a. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other. The cylindrical mold 43 is chosen to correspond to the length of the raw edge V-belt B to be produced. Note that short fibers, resin powder, or the like may be attached to the inner peripheral surface of the cylindrical mold 43 and/or the outer peripheral surface of the uncrosslinked slab S' in advance.

Figure 21B:
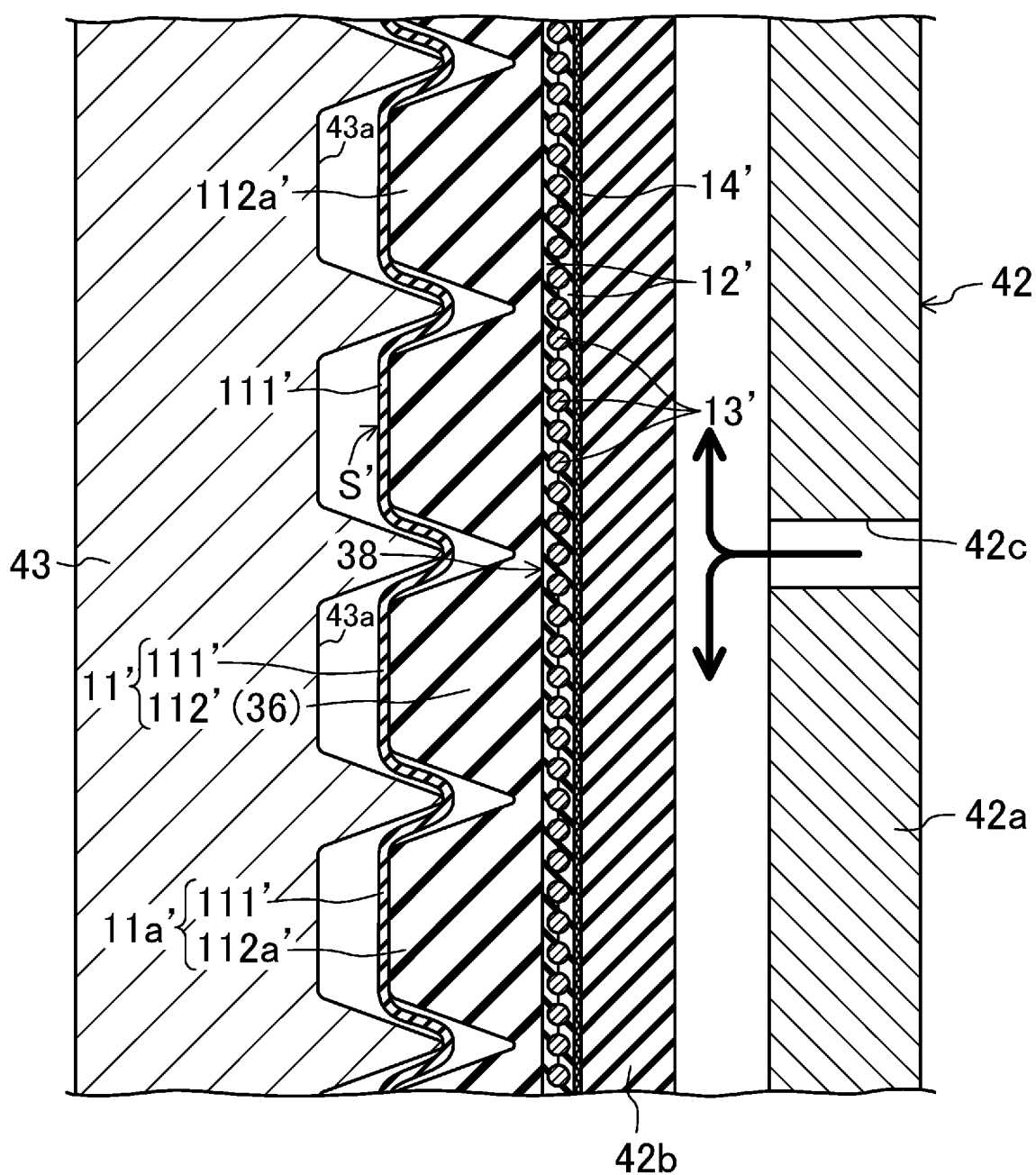
FIG. 21B is a second diagram for showing the crosslinking step of the production method 2-4 of the second embodiment.

The temperature of the cylindrical mold 43 is increased by the heating means, and the pressurizing means introduces high-pressure air into the drum body 42a of the expansion drum 42 so as to expand the expansion sleeve 42b radially outward. This state is maintained for a predetermined period of time. At this moment, as shown in FIG. 21B, the uncrosslinked slab S' is pressed against the cylindrical mold 43 by the expansion sleeve 42b which is expanded and comes into contact with the uncrosslinked slab S'. That is, the pressing of the shaped structure 36 toward the cylindrical mold 43 is carried out by expanding the expansion sleeve 42b, located radially inward of the shaped structure 36, and pushing the shaped structure 36 from radially inside. The core rubber sheet 112' pushes and stretches the surface rubber sheet 111'. The core rubber sheet 112' and the surface rubber sheet 111' which covers the core rubber sheet 112' together form the compressed rubber sheet 11'. Further, each of the plurality of core rubber layer-forming portions 112a' of the core rubber sheet 112' enters an associated one of the compressed rubber layer-shape grooves 43a of the cylindrical mold 43, while pushing and stretching the surface rubber sheet 111'. The core rubber layer-forming portion 112a' and the surface rubber sheet 111' thus covering the core rubber layer-forming portions 112a' together form the compressed rubber layer forming portion 11a' in the associated one of the compressed rubber layer-shape grooves 43a. That is, the same state as shown in FIG. 17 according to the production method 2-1 is obtainable at this stage. The uncrosslinked slab S' is heated by the cylindrical mold 43, while each of the compressed rubber layer-forming portions 11a' (each of the core rubber layer-forming portions 112a' covered with the surface rubber sheet 111') is fitted in an associated one of the compressed rubber layer-shape grooves 43a of the cylindrical mold 43. In this manner, the rubber components contained in the surface rubber sheet 111', the core rubber sheet 112', and the adhesive rubber sheet 12' that are included in the uncrosslinked slab S' are crosslinked to be integrated with one another. As a result, a continuous member of belt bodies 10 for a plurality of raw edge V-belts B, each including the compression layer 11 comprised of the surface rubber layer 111 and the core rubber layer 112 and including the adhesive rubber layer 12, is produced. At the same time, the rubber components adhere to, and is combined with, the cord 13' and the reinforcing fabric 14'. A cylindrical belt slab S is thus formed eventually.

The other features and advantages are the same as those of the production method 2-1.

The production method 2-4 is applicable to the production method 1-3, in which a crosslinking apparatus 40 including an expansion drum 42 that is attachable to, and detachable from, a base 41 similarly to the expansion drum 42 of the production method 1-3 is used. The expansion drum 42 may serve as a shaping mandrel 31 to produce the raw edge V-belt B of the second embodiment.

(Production Method 2-5)

A production method 2-5 will be described with reference to FIG. 22.

According to the production method 2-5, a core rubber sheet 112' having a predetermined length may be formed into a cylindrical shape with its both ends joined together such that the core rubber layer-forming portions 112a' face outside. A shaped structure 36 which has a cylindrical shape is produced in this manner. The shaped structure 36 is made of the uncrosslinked rubber composition and has, on its outer peripheral surface, a plurality of core rubber layer-forming portions 112a' extending in the circumferential direction and arranged adjacent to each other in the axial direction. The core rubber sheet 112' is cut with an ultrasound cutter or the like, and its ends are butt jointed. To increase the joint strength, the butt joint is suitably achieved by abutting surfaces, of the core rubber sheet 112', which are oblique with respect to the thickness direction of the core rubber sheet 112'.

Next, the surface rubber sheet 111' is wrapped around the shaped structure 36. At this moment, the surface rubber sheet 111' is wrapped, while forming a cylindrical shape, with the tops of the core rubber layer-forming portions 112a' of the shaped structure 36 supporting the surface rubber sheet 111'. The surface rubber sheet 111' is thus stacked on the shaped structure 36. Ends of the surface rubber sheet 111' is butt jointed, lap jointed, or jointed, on an underlying layer, with a space between the ends. A surface rubber sheet 111' having a predetermined length may be formed into a cylindrical shape with its both ends joined together, and this surface rubber sheet 111' may be fitted over the shaped structure 36.

Further, similarly to the steps of the production method 1-1 shown in FIGS. 4A to 4C, the reinforcing fabric 14', the adhesive rubber sheet 12', the cord 13', and another adhesive rubber sheet 12' are stacked on the shaping mandrel 31 in the stated order. After that, the entire circumferential surface of the stacked structure is pressed with a roller 32 on the adhesive rubber sheet 12' to integrate the stacked structure and produce a cylindrical tensile member 38.

Figure 22:
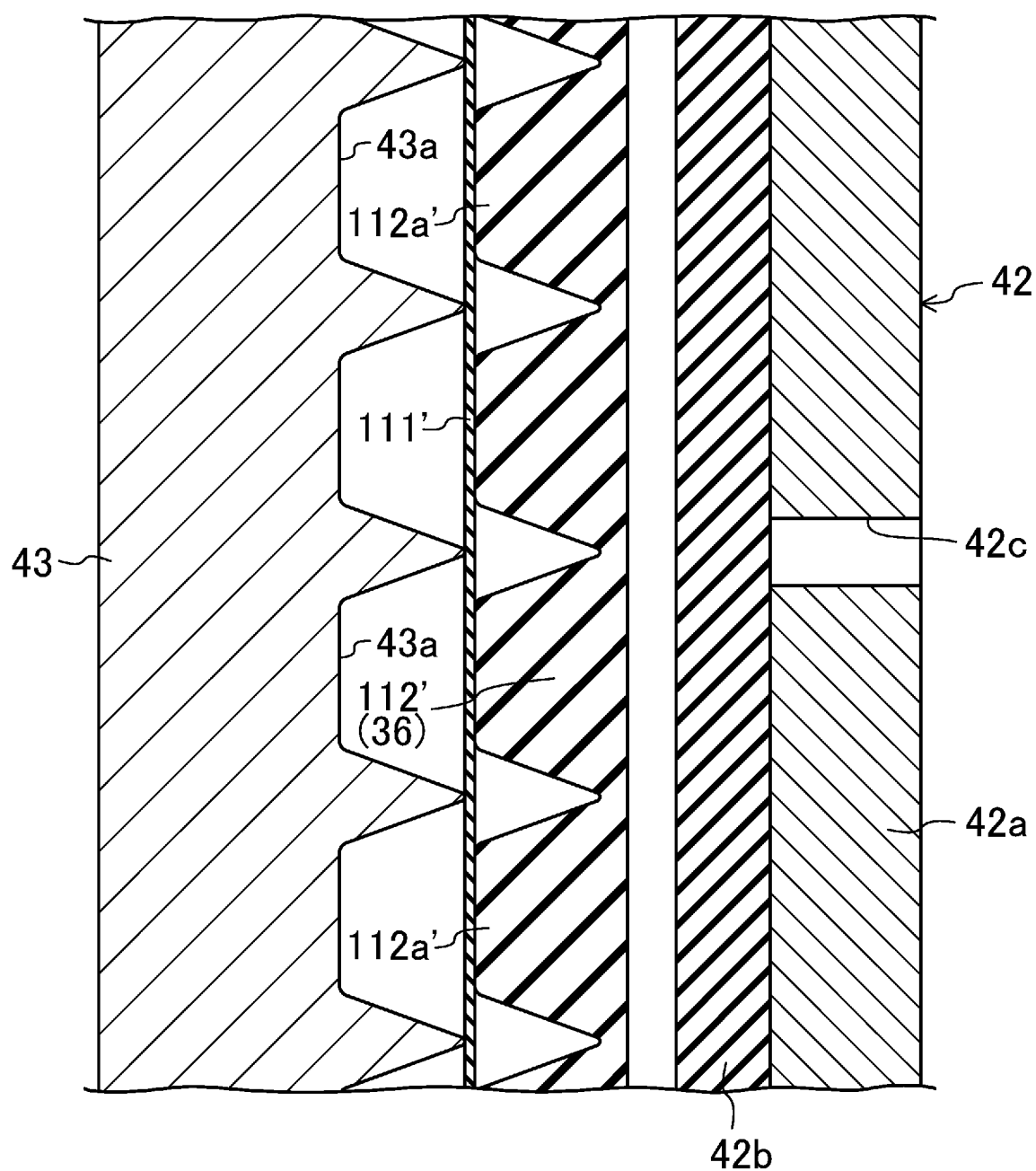
FIG. 22 is a diagram for showing a crosslinking step of a production method 2-5 of the second embodiment.

As shown in FIG. 22, in the crosslinking step, the shaped structure 36 covered with the surface rubber sheet 111' is placed inside the cylindrical mold 43 which has been removed from the base 41 of the crosslinking apparatus 40. More specifically, the shaped structure 36 covered with the surface rubber sheet 111' is set inside the cylindrical mold 43 such that the outer periphery of the surface rubber sheet 111' comes into contact with the cylindrical mold 43 at locations apart from each other in the circumferential direction, and that each of the plurality of core rubber layer-forming portions 112a' of the shaped structure 36 is located at the opening of an associated one of the core rubber layer-shape grooves 43a of the cylindrical mold 43. At this moment, the shaped structure 36 and the surface rubber sheet 111' are set inside the cylindrical mold 43 such that the shaped structure 36 is positioned inside, and the surface rubber sheet 111' is positioned outside, with respect to each other. The core rubber layer-forming portions 112a' may push the surface rubber sheet 111' such that part of the core rubber layer-forming portion 112a' enters the associated one of the core rubber layer-shape grooves 43a. The cylindrical mold 43 is chosen to correspond to the length of the raw edge V-belt B to be produced. Note that short fibers, resin powder, or the like may be attached in advance to the inner peripheral surface of the cylindrical mold 43 and/or the outer peripheral surface of the surface rubber sheet 111'.

The tensile member 38 is removed from the shaping mandrel 31, and is then fitted to the shaped structure 36 set in the cylindrical mold 43, such that the outer peripheral surface of the tensile member 38 comes into contact with the inner peripheral surface of the shaped structure 36, that is, so as to be in a similar positional relationship shown in FIG. 21A illustrating the production method 2-4. This means that the tensile member 38 is placed between the shaped structure 36 and the expansion sleeve 42b of the expansion drum 42. The tensile member 38 is comprised of an uncrosslinked rubber composition having a cylindrical shape in which the cord 13' is embedded so as to form a helical pattern having pitches in the axial direction. Before expansion of the expansion sleeve 42b, there is a space between the tensile member 38 and the expansion sleeve 42b, and the shaped structure 36 and the tensile member 38 are in contact with each other.

The other features and advantages are the same as those of the production method 2-4.

The production method 2-5 is applicable to the production method 1-4, in which a crosslinking apparatus 40 including an expansion drum 42 that is attachable to, and detachable from, a base 41 similarly to the expansion drum 42 of the production method 1-4 is used. The expansion drum 42 may serve as a shaping mandrel 31 to produce the raw edge V-belt B of the second embodiment.

Other Embodiments

Figure 23A:
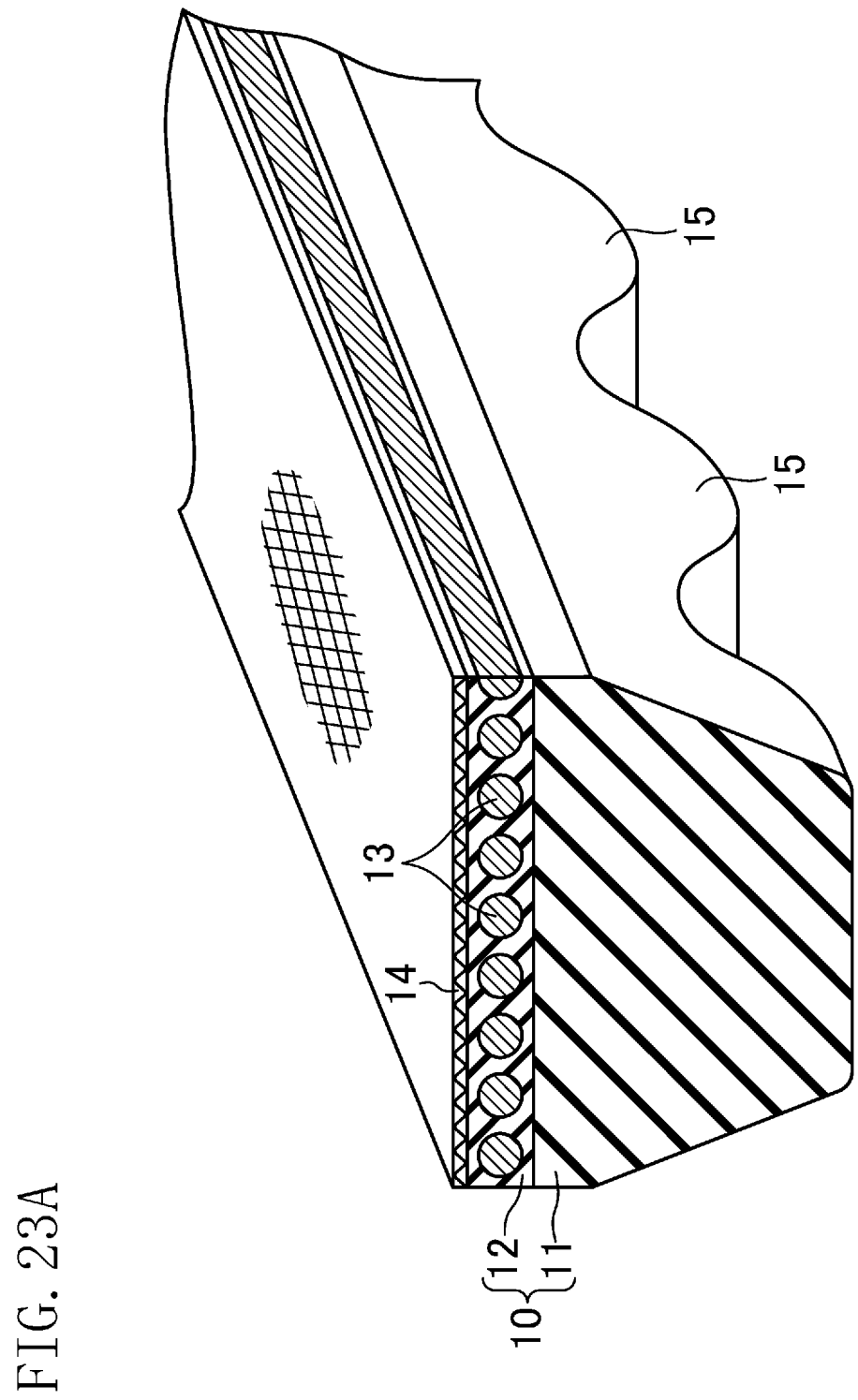
FIG. 23A is a perspective view of a single cogged raw edge V-belt produced according to another embodiment.
Figure 23B:
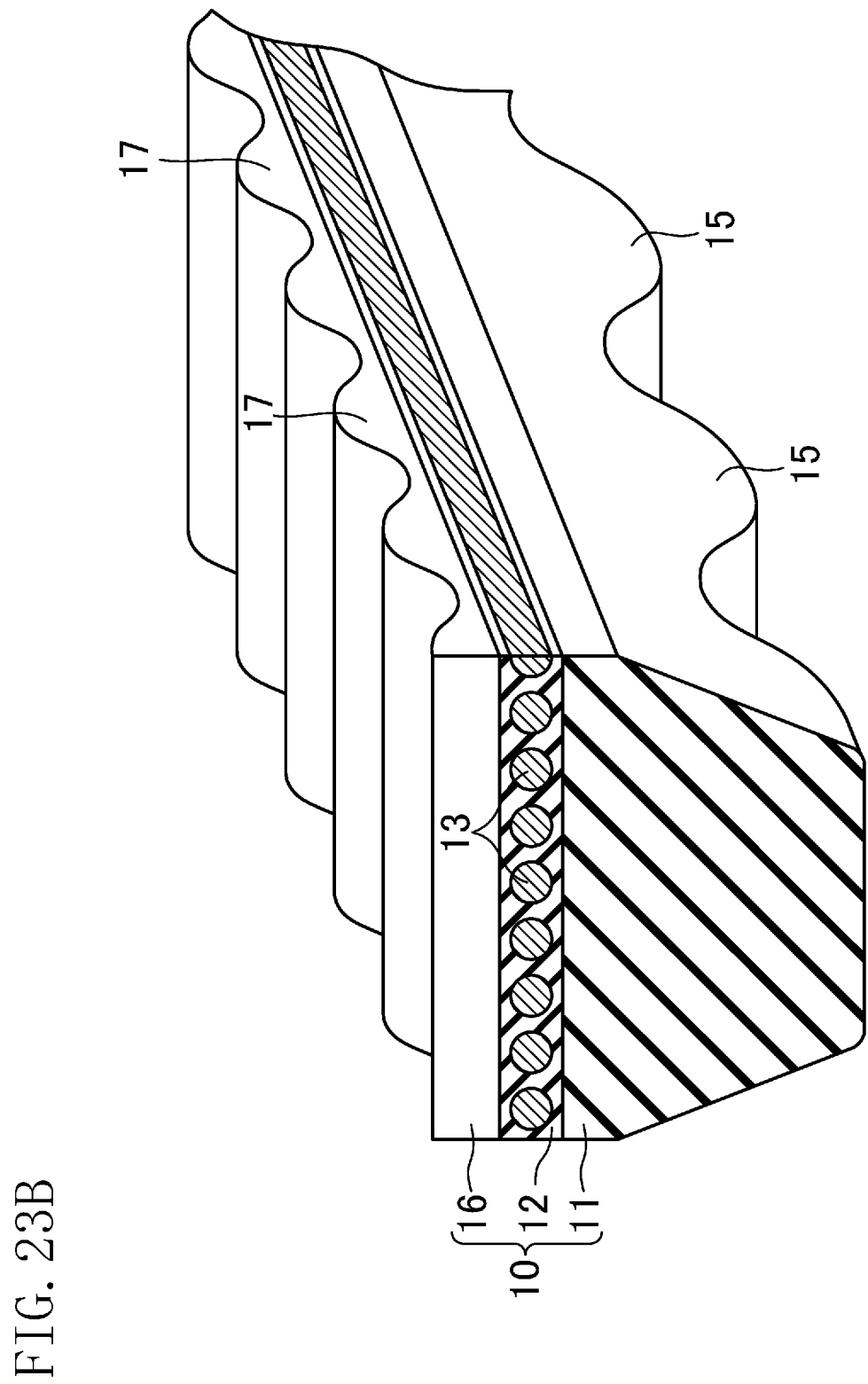
FIG. 23B is a perspective view of a double cogged raw edge V-belt produced according to another embodiment.
Figure 24A:
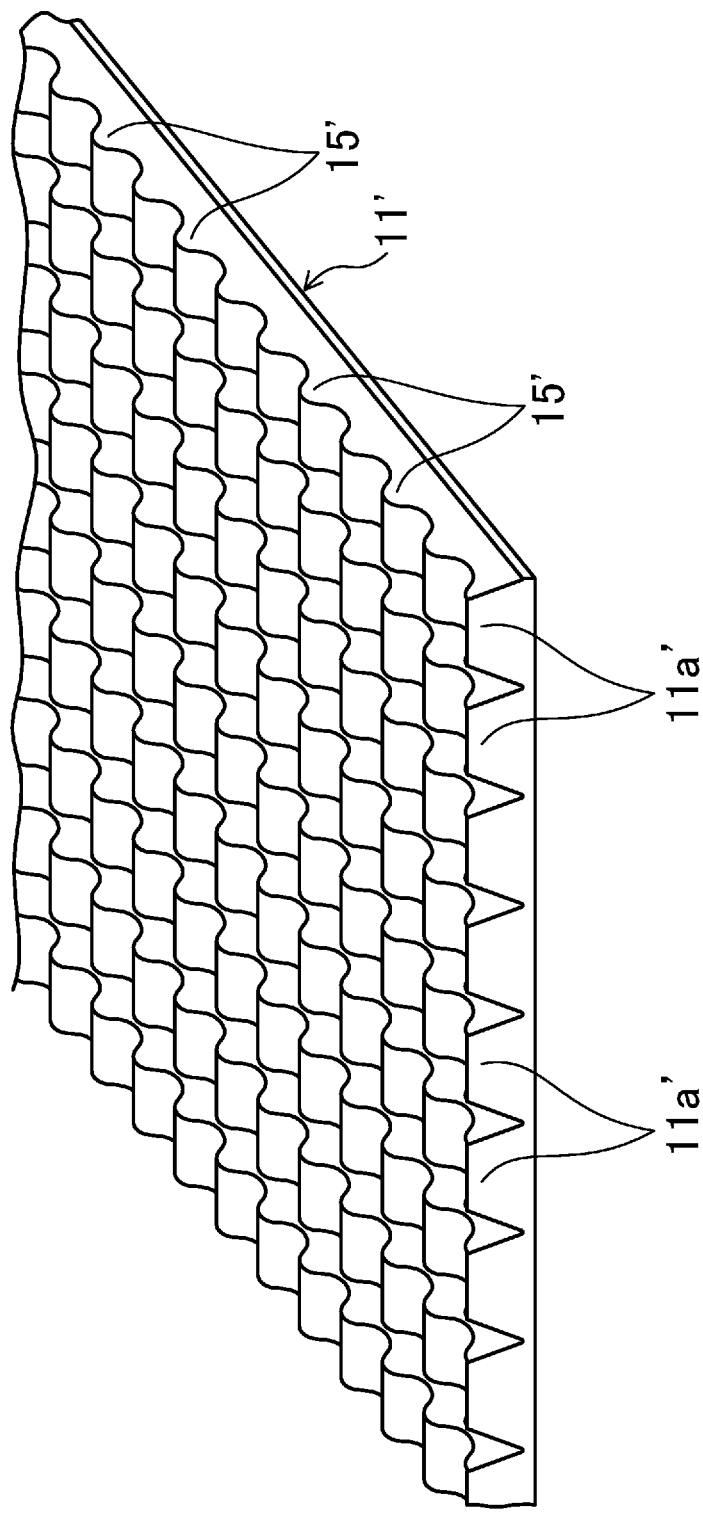
FIG. 24A is a perspective view of a compressed rubber sheet for use in another embodiment.
Figure 24B:
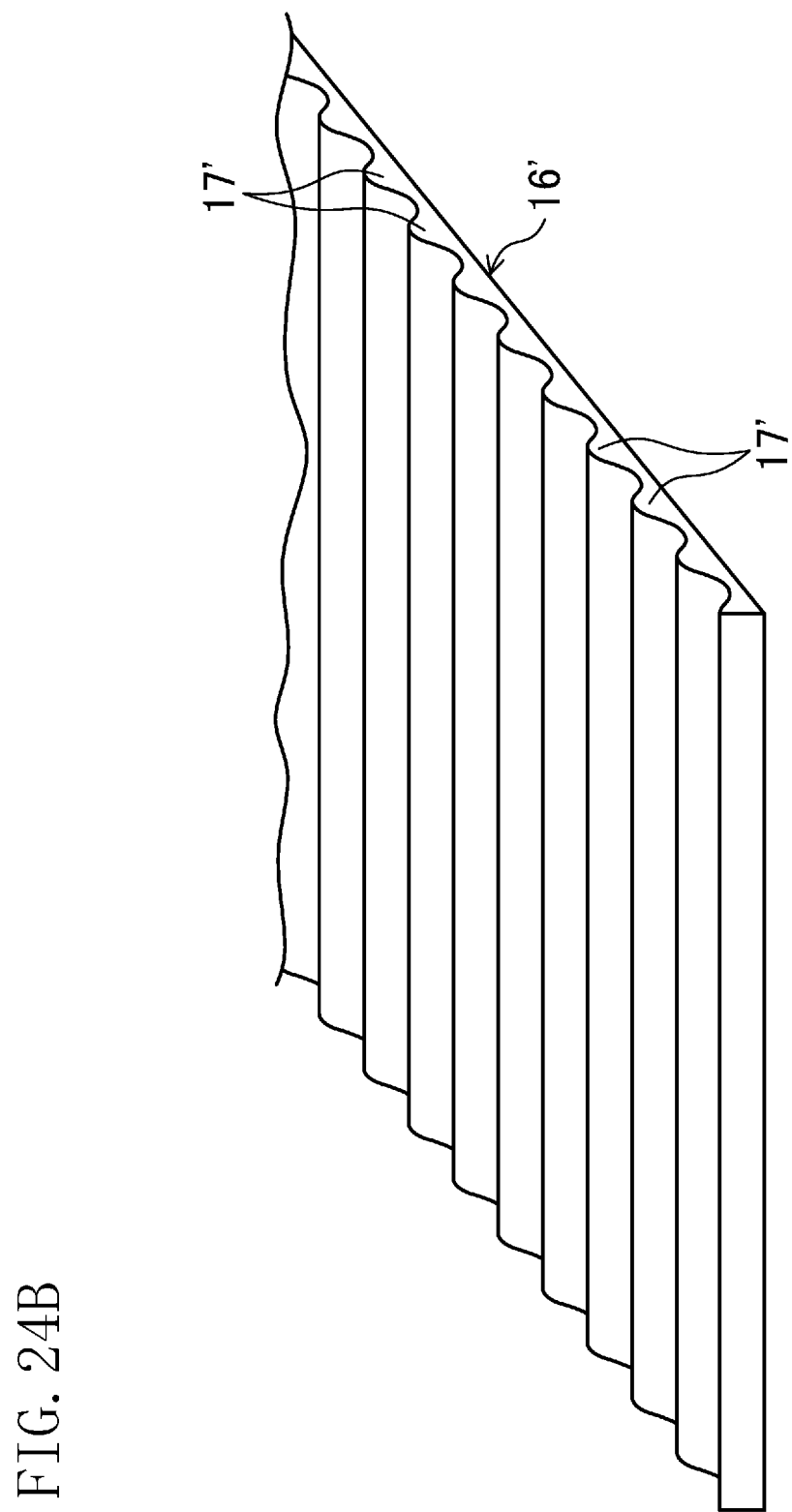
FIG. 24B is a perspective view of a stretch rubber sheet for use in another embodiment.

In the above first and second embodiments, the raw edge V-belts B having configurations shown in FIGS. 1 and 14 have been described as non-limiting examples. For example, the embodiments are also applicable to production of a single cogged raw edge V-belt B including a compressed rubber layer 11 having lower cogs 15 as shown in FIG. 23A, and a double cogged raw edge V-belt B including a compressed rubber layer 11 having lower cogs 15 and a stretch rubber layer 16 having upper cogs 17 as shown in FIG. 23B. In the case of producing the raw edge V-belt B including the compressed rubber layer 11 having the lower cogs 15, it is suitable to use a compressed rubber sheet 11' having lower cog-forming portions 15' as shown in FIG. 24A. In the case of producing the raw edge V-belt B including the stretch rubber layer 16 having the upper cogs 17, it is suitable to use a stretch rubber sheet 16' having upper cog-forming portions 17' as shown in FIG. 24B. The compressed rubber sheet 11' having the lower cog-forming portions 15' and the stretch rubber sheet 16' having the upper cog-forming portions 17' can be prepared by a method similar to the production methods 1-1, 2-1, and 2-3.

In the first and second embodiments described above, the uncrosslinked slab S' is crosslinked by using the cylindrical mold 43. However, the embodiments are not particularly limited to this. For example, the uncrosslinked slab is suspended between two shafts, and a portion of the uncrosslinked slab is press molded between a flat-shaped mold and a plate-shaped belt mold having a plurality of compressed rubber layer-shape grooves which are arranged adjacent to each other in the groove width direction. The uncrosslinked slab is crosslinked while being passed in the circumferential direction.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A production method of a raw edge V-belt having a compressed rubber layer which forms an inner peripheral side, in a thickness direction, of the raw edge V-belt, the compressed rubber layer including a surface rubber layer constituting a surface portion of the compressed rubber layer and a core rubber layer constituting an inner portion of the compressed rubber layer, the method comprising:
    a step of forming a shaped structure having a cylindrical shape, made of a first uncrosslinked rubber composition, and having, on its outer peripheral surface, a plurality of ridges extending in the circumferential direction and arranged adjacent to one another in an axial direction;
    a step of forming compressed rubber layer-forming portions after forming the ridges, each of the compressed rubber layer-forming portions to be the compressed rubber layer, by covering the formed ridges with a second uncrosslinked rubber composition, which is to be the surface rubber layer;
    a step of molding a cylindrical belt slab, using a belt mold having a plurality of compressed rubber layer-shape grooves arranged adjacent to one another in a groove width direction, by heating and pressing, toward the belt mold, and thereby crosslinking the shaped structure, formed in the step of forming the shaped structure, together with the second uncrosslinked rubber composition and thereby integrating the shaped structure and the second uncrosslinked rubber composition, while having each of the compressed rubber layer-forming portions, which are formed in the step of forming the compressed rubber layer-forming portions, fitted in an associated one of the compressed rubber layer-shape grooves of the belt mold; and
    a step of cutting the belt slab, molded in the step of molding the belt slab, into ring-shaped pieces such that one ring-shaped piece corresponds to one compressed rubber layer-forming portion.
2. The production method of claim 1, wherein
the belt mold has a cylindrical shape having, on an inner peripheral surface thereof, the plurality of compressed rubber layer-shape grooves each extending in the circumferential direction and arranged adjacent to one another in the axial direction, and
the shaped structure is placed inside the belt mold.

3. The production method of claim 1, wherein
prior to the covering of the ridges with the second uncrosslinked composition, the second uncrosslinked composition is subjected to a pleating process so that a cross section of the second uncrosslinked composition has same pitches as pitches of the ridges, and
portions of the second uncrosslinked composition which protrude toward the ridges are located at grooves between the ridges.
4. The production method of claim 1, wherein
prior to the covering of the ridges with the second uncrosslinked composition, the second uncrosslinked composition is formed into a shape that fits surfaces of the ridges.
5. The production method of claim 1, wherein
each of the compressed rubber layer-forming portions is fitted in an associated one of the compressed rubber layer-shape grooves prior to the heating the shaped structure and pressing the shaped structure toward the belt mold.
6. The production method of any one of claim 2, wherein
the pressing of the shaped structure toward the belt mold is carried out by expanding an expansion sleeve located radially inward of the shaped structure and pressing the shaped structure from radially inside by the expansion sleeve.
7. The production method of claim 6, wherein
a tensile member is provided between the shaped structure and the expansion sleeve, the tensile member being comprised of a third uncrosslinked rubber composition having a cylindrical shape in which a cord is embedded so as to form a helical pattern having pitches in the axial direction.
8. The production method of claim 7, wherein
the tensile member is provided on the expansion sleeve prior to the expansion of the expansion sleeve.
9. The production method of claim 7, wherein
a space is formed between the tensile member and the expansion sleeve prior to the expansion of the expansion sleeve.
10. The production method of claim 8, wherein
the shaped structure and the tensile member are brought into contact with each other prior to the expansion of the expansion sleeve.
11. The production method of claim 8, wherein
a space is formed between the shaped structure and the tensile member prior to the expansion of the expansion sleeve.
12. The production method of claim 1, further comprising
a step of forming a rubber sheet made of the first uncrosslinked rubber composition having the plurality of ridges arranged adjacent to one another, the rubber sheet being used as the shaped structure.
13. The production method of claim 12, wherein
the step of forming the compressed rubber layer-forming portions is carried out after the step of forming the shaped structure.
14. The production method of claim 2, wherein
the second uncrosslinked rubber composition is in contact with an inside of the belt mold prior to the pressing of the shaped structure toward the belt mold.
15. The production method of claim 14, wherein
the second uncrosslinked rubber composition is in contact with the inside of the belt mold at locations apart from each other in an axial direction of the belt mold.

16. A production method of a raw edge V-belt having a compressed rubber layer which forms an inner peripheral side, in a thickness direction, of the raw edge V-belt, the compressed rubber layer including a surface rubber layer constituting a surface portion of the compressed rubber layer and a core rubber layer constituting an inner portion of the compressed rubber layer, the method comprising:

a step of forming a rubber sheet made of a first uncrosslinked rubber composition and having a plurality of ridges extending parallel to one another and arranged adjacent to one another, each of the plurality of ridges to be the core rubber layer;

a step of forming compressed rubber layer-forming portions, each of which is to be the compressed rubber layer, by covering the plurality of ridges of the rubber sheet formed in the step of forming the rubber sheet with a second uncrosslinked rubber composition, which is to be the surface rubber layer;

a step of forming a cylindrical object from an object formed to have the compressed rubber layer-forming portions in the step of forming the compressed rubber layer-forming portions by covering the plurality of ridges of the rubber sheet with the second uncrosslinked rubber composition, the cylindrical object having the compressed rubber layer-forming portions on its outer peripheral surface, the compressed rubber layer-forming portions extending in a circumferential direction and arranged adjacent to one another in an axial direction;

a step of molding a cylindrical belt slab, using a belt mold having a plurality of compressed rubber layer-shape grooves arranged adjacent to one another in a groove width direction, by heating and pressing, toward the belt mold, and thereby crosslinking the cylindrical object, formed in the step of forming the cylindrical object, while having each of the compressed rubber layer-forming portions fitted in an associated one of the compressed rubber layer-shape grooves of the belt mold; and a step of cutting the belt slab, molded in the step of molding the belt slab, into ring-shaped pieces such that one ring-shaped piece corresponds to one compressed rubber layer-forming portion.

17. The production method of claim 16, wherein the belt mold has a cylindrical shape having, on an inner peripheral surface thereof, the plurality of compressed rubber layer-shape grooves each extending in the circumferential direction and arranged adjacent to one another in the axial direction, and the cylindrical object is placed inside the belt mold.

18. The production method of claim 17, wherein the cylindrical object is in contact with an inside of the belt mold prior to the pressing of the cylindrical object toward the belt mold.

* * * * *